US012757167B2

(12) United States Patent
Guan et al.

(10) Patent No.: US 12,757,167 B2

(45) Date of Patent: Oct. 6, 2026

(54) WIRELESS COMMUNICATION METHOD, COMMUNICATION APPARATUS, AND COMMUNICATION SYSTEM

(71) Applicant: HUAWEI TECHNOLOGIES CO., LTD., Shenzhen (CN)

(72) Inventors: Lei Guan, Beijing (CN); Shengyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 18/458,620

(22) Filed: Aug. 30, 2023

(65) Prior Publication Data

US 2023/0413240 A1 Dec. 21, 2023

Related U.S. Application Data

(63) Continuation of application No. PCT/CN2021/078786, filed on Mar. 2, 2021.

(51) Int. Cl.

*H04W 72/02* (2009.01)
*H04W 56/00* (2009.01)
*H04W 72/0453* (2023.01)

(52) U.S. Cl.

CPC ....... *H04W 72/02* (2013.01); *H04W 56/0015* (2013.01); *H04W 72/0453* (2013.01)

(58) Field of Classification Search

CPC ............. H04W 72/02; H04W 56/0015; H04W 72/0453; H04L 5/0005; H04L 5/0007;

(Continued)

(56) References Cited

U.S. PATENT DOCUMENTS

2018/0198659 A1 7/2018 Ko et al.
2019/0364523 A1 11/2019 Wei et al.

(Continued)

FOREIGN PATENT DOCUMENTS

CN 107278383 A 10/2017

OTHER PUBLICATIONS

Extended European Search Report issued in corresponding European Application No. 21928481.7, dated Mar. 13, 2024, pp. 1-8.

(Continued)

*Primary Examiner* — Yu-Wen Chang

(74) *Attorney, Agent, or Firm* — HAUPTMAN HAM, LLP

(57) ABSTRACT

A wireless communication method, a communication apparatus, and a communication system. A terminal determines, based on a detected SSB, a set corresponding to the SSB, and further determines resource multiplexing manners of a plurality of SSBs in the set. Because the resource multiplexing manners of the plurality of SSBs in the set are able to be flexibly configured, adaptation to various TDD configurations are able to be implemented. In response to downlink resources in a TDD configuration being insufficient, the plurality of SSBs in the set are sent in a frequency division multiplexing manner as much as possible. In response to the downlink resources in the TDD configuration being sufficient, the plurality of SSBs in the set are sent in a time division multiplexing manner or a frequency division multiplexing manner.

19 Claims, 11 Drawing Sheets

(58) Field of Classification Search
CPC ..... H04L 5/001; H04L 5/0048; H04L 5/0051; H04L 5/1469; H04L 5/0053
See application file for complete search history.

(56) References Cited

U.S. PATENT DOCUMENTS

| | | | | |
|---|---|---|---|---|
| 2020/0099500 | A1 | 3/2020 | Huang et al. | |
| 2021/0258065 | A1* | 8/2021 | Wang | H04B 7/06964 |
| 2022/0077976 | A1* | 3/2022 | Horn | H04B 7/0695 |
| 2022/0104153 | A1* | 3/2022 | Ko | H04W 56/00 |
| 2022/0240309 | A1* | 7/2022 | Sakhnini | H04L 5/0048 |
| 2022/0408348 | A1* | 12/2022 | Li | H04L 5/0053 |
| 2023/0422310 | A1* | 12/2023 | Kim | H04W 72/0453 |
| 2024/0015678 | A1* | 1/2024 | Liu | H04L 5/005 |

OTHER PUBLICATIONS

International Search Report issued in corresponding International Application No. PCT/CN2021/078786, dated May 12, 2021, pp. 1-11.

* cited by examiner

WIRELESS COMMUNICATION METHOD, COMMUNICATION APPARATUS, AND COMMUNICATION SYSTEM

CROSS-REFERENCE TO RELATED APPLICATIONS

This application is a continuation of International Application No. PCT/CN2021/078786, filed on Mar. 2, 2021, the disclosure of which is hereby incorporated by reference in its entirety.

BACKGROUND

Compared with a 4th generation (4G) long term evolution (LTE) system, a 5th generation (5G) new radio (NR) system provides more flexible system design, including basic parameter design, frame structure design, channel time-frequency resource design, and the like, to better support forward compatibility and scalability. However, common signal design is still not flexible enough.

SUMMARY

Embodiments described herein provide a wireless communication method, a communication apparatus, and a communication system to flexibly configure a resource multiplexing manner of a common signal, so as to flexibly send the common signal.

Embodiments described herein are specifically implemented by using the following technical solutions.

According to a first aspect, at least one embodiment provides a wireless communication method. The method is performed by a terminal or a component (for example, a chip or an apparatus) used for the terminal. The method includes: detecting a common signal; determining, from a plurality of sets based on a detected first common signal, a first set corresponding to the first common signal, where at least one of the plurality of sets includes a plurality of common signals, the first set includes the first common signal, the first common signal includes a synchronization signal, and resource multiplexing manners of the plurality of common signals include time division multiplexing and/or frequency division multiplexing; and determining a first index of the first common signal in the first set, where the first index corresponds to a resource of the first common signal, and the resource includes a time domain resource and/or a frequency domain resource.

Based on the solution, the terminal determines, based on the detected first common signal, the first set corresponding to the first common signal, and further determines resource multiplexing manners of the plurality of common signals in the first set. According to the method, in response to the plurality of common signals being sent, the resource multiplexing manners of the plurality of common signals is configured more flexibly, so as to flexibly send the plurality of common signals. Because the resource multiplexing manners of the plurality of common signals in the set is flexibly configured, adaptation to various TDD configurations is implemented. For example, in response to downlink resources in a TDD configuration being insufficient, the plurality of common signals in the set is sent in a frequency division multiplexing manner as much as possible. For another example, in response to the downlink resources in the TDD configuration being sufficient, the plurality of common signals in the set is sent in a time division multiplexing manner and/or a frequency division multiplexing manner. Therefore, the method helps improve communication efficiency.

In at least one embodiment, the determining, from a plurality of sets, a first set corresponding to the first common signal specifically includes: determining, from the plurality of sets based on a sequence of the synchronization signal, the first set corresponding to the sequence of the synchronization signal.

In at least one embodiment, the determining, from a plurality of sets, a first set corresponding to the first common signal specifically includes: determining the first set from the plurality of sets based on a first channel corresponding to the first common signal.

In at least one embodiment, the determining the first set from the plurality of sets based on a first channel corresponding to the first common signal specifically includes: determining the first set from the plurality of sets based on one or more of the following pieces of information corresponding to the first channel information indicating the first set, a scrambling code of the first channel, or a DMRS sequence of the first channel.

In at least one embodiment, the first channel is a broadcast channel; or the first channel is a channel carrying system information; or the first channel is a control channel, and the control channel is used to schedule the channel carrying system information.

In at least one embodiment, the determining, from a plurality of sets, a first set corresponding to the first common signal specifically includes: determining, from the plurality of sets based on a minimum carrier bandwidth capability supported by the terminal, the first set corresponding to the minimum carrier bandwidth capability supported by the terminal.

In at least one embodiment, the determining, from a plurality of sets, a first set corresponding to the first common signal specifically includes: determining, from the plurality of sets based on a frequency band in which the terminal operates, the first set corresponding to the frequency band in which the terminal operates.

In at least one embodiment, the determining, from a plurality of sets, a first set corresponding to the first common signal specifically includes: determining, from the plurality of sets based on a subcarrier spacing of the first common signal, the first set corresponding to the subcarrier spacing of the first common signal; or determining, from the plurality of sets based on a subcarrier spacing combination, the first set corresponding to the subcarrier spacing combination, where the subcarrier spacing combination includes a first subcarrier spacing of the first common signal and a second subcarrier spacing of a channel corresponding to the first common signal.

In at least one embodiment, the determining, from a plurality of sets, a first set corresponding to the first common signal specifically includes: determining, from the plurality of sets based on a time division duplexing TDD configuration, the first set corresponding to the TDD configuration.

According to one or more of the implementations, the first set is determined from the plurality of sets. Implementation is relatively simple and flexible.

In at least one embodiment, the determining a first index of the first common signal in the first set specifically includes: determining the first index of the first common signal in the first set based on the sequence of the synchronization signal.

In at least one embodiment, the determining a first index of the first common signal in the first set specifically includes: determining the first index of the first common signal in the first set based on the first channel corresponding to the first common signal.

In at least one embodiment, the determining the first index of the first common signal in the first set based on the first channel corresponding to the first common signal specifically includes: determining the first index of the first common signal in the first set based on one or more of the following pieces of information corresponding to the first channel: information indicating the first index, the scrambling code of the first channel, or the DMRS sequence of the first channel, where the first channel is a broadcast channel; or the first channel is a channel carrying system information; or the first channel is a control channel, and the control channel is used to schedule the channel carrying system information.

According to one or more of the implementations, the first index of the first common signal in the first set is determined. Implementation is relatively simple and flexible.

In at least one embodiment, the plurality of sets include one or more of the following sets:

- a second set, where a resource multiplexing manner of a common signal in the second set is time division multiplexing;
- a third set, where resource multiplexing manners of two common signals in the third set are frequency division multiplexing, and a minimum frequency domain distance between the two common signals in the third set that use frequency division multiplexing is a first distance; and
- a fourth set, where resource multiplexing manners of two common signals in the fourth set are frequency division multiplexing, a minimum frequency domain distance between the two common signals in the fourth set that use frequency division multiplexing is a second distance, and the second distance is different from the first distance.

In at least one embodiment, the plurality of sets include one or more of the following sets:

- a fifth set, where a common signal in the fifth set is located in one periodic time window; and
- a sixth set, where a first part of common signals and a second part of common signals in the sixth set are located in different periodic time windows.

In at least one embodiment, a resource of a second common signal is determined based on the first index; and the second common signal is received based on the resource of the second common signal, where the second common signal includes a control channel or a channel carrying system information, and the control channel is used to schedule the channel carrying system information.

In at least one embodiment, a resource of a common signal other than the first common signal in the first set is determined based on the first set and the first index.

According to a second aspect, at least one embodiment provides a wireless communication method. The method is performed by a radio access network device or a component (for example, a chip or an apparatus) used for the radio access network device. The method includes: determining a first set, where the first set is one of a plurality of sets, at least one of the plurality of sets includes a plurality of common signals, and resource multiplexing manners of the plurality of common signals include time division multiplexing and/or frequency division multiplexing; and sending a plurality of common signals in the first set to a terminal, where the first set includes a first common signal, the first common signal is one of the plurality of common signals, the first common signal includes a synchronization signal, and the first common signal is a common signal in the first set that is detected by the terminal.

In at least one embodiment, a sequence of the synchronization signal corresponds to the first set.

In at least one embodiment, a first channel corresponding to the first common signal corresponds to the first set.

In at least one embodiment, one or more of the following pieces of information corresponding to the first channel correspond to the first set: information indicating the first set, a scrambling code of the first channel, or a demodulation reference signal DMRS sequence of the first channel.

In at least one embodiment, the first channel is a broadcast channel; or the first channel is a channel carrying system information; or the first channel is a control channel, and the control channel is used to schedule the channel carrying system information.

In at least one embodiment, a minimum carrier bandwidth capability supported by the terminal corresponds to the first set.

In at least one embodiment, a frequency band in which the terminal operates corresponds to the first set.

In at least one embodiment, a subcarrier spacing of the first common signal corresponds to the first set; or a subcarrier spacing combination corresponds to the first set, where the subcarrier spacing combination includes a first subcarrier spacing of the first common signal and a second subcarrier spacing of a channel corresponding to the first common signal.

In at least one embodiment, a time division duplexing TDD configuration corresponds to the first set.

In at least one embodiment, the sequence of the synchronization signal corresponds to a first index of the first common signal in the first set.

In at least one embodiment, a first channel corresponding to a plurality of common signals in the first set corresponds to indexes of the plurality of common signals in the first set, where the first channel is a broadcast channel; or the first channel is a channel carrying system information; or the first channel is a control channel, and the control channel is used to schedule the channel carrying system information.

In at least one embodiment, one or more of the following pieces of information corresponding to the first channel correspond to the indexes of the plurality of common signals in the first set: information indicating the first set, the scrambling code of the first channel, or the DMRS sequence of the first channel.

In at least one embodiment, the plurality of sets include one or more of the following sets:

- a second set, where a resource multiplexing manner of a common signal in the second set is time division multiplexing;
- a third set, where resource multiplexing manners of two common signals in the third set are frequency division multiplexing, and a minimum frequency domain distance between the two common signals in the third set that use frequency division multiplexing is a first distance; and
- a fourth set, where resource multiplexing manners of two common signals in the fourth set are frequency division multiplexing, a minimum frequency domain distance between the two common signals in the fourth set that use frequency division multiplexing is a second distance, and the second distance is different from the first distance.

In at least one embodiment, the plurality of sets include one or more of the following sets:

a fifth set, where a common signal in the fifth set is located in one periodic time window; and a sixth set, where a first part of common signals and a second part of common signals in the sixth set are located in different periodic time windows.

According to a third aspect, at least one embodiment provides a communication apparatus. The apparatus is a terminal or a chip used for the terminal. The apparatus has a function of implementing any implementation of the first aspect. The function is implemented by hardware or by executing corresponding software through hardware. The hardware or software includes one or more modules corresponding to the function.

According to a fourth aspect, at least one embodiment provides a communication apparatus. The apparatus is a radio access network device or a chip used for the radio access network device. The apparatus has a function of implementing any implementation of the second aspect. The function is implemented by hardware or by executing corresponding software through hardware. The hardware or software includes one or more modules corresponding to the function.

According to a fifth aspect, at least one embodiment provides a communication apparatus, including a processor and a memory. The memory is configured to store computer instructions. In response to the apparatus running, the processor executes the computer instructions stored in the memory, so that the apparatus is enabled to perform the method according to any implementation of the first aspect or the second aspect.

According to a sixth aspect, at least one embodiment provides a communication apparatus, including a unit or means configured to perform steps of the method according to any implementation of the first aspect or the second aspect.

According to a seventh aspect, at least one embodiment provides a communication apparatus, including a processor and an interface circuit. The processor is configured to: communicate with another apparatus through the interface circuit, and perform the method according to any implementation of the first aspect or the second aspect. There are one or more processors.

According to an eighth aspect, at least one embodiment provides a communication apparatus, which includes a processor coupled to a memory. The processor is configured to invoke a program stored in the memory, to perform the method according to any implementation of the first aspect or the second aspect. The memory is located inside or outside the apparatus. In addition, there are one or more processors.

According to a ninth aspect, at least one embodiment further provides a computer-readable storage medium. The computer-readable storage medium stores instructions, and in response to the instructions being executed on a communication apparatus, the method according to any implementation of the first aspect or the second aspect is performed.

According to a tenth aspect, at least one embodiment further provides a computer program product. The computer program product includes a computer program. In response to the computer program being run by a communication apparatus, the method according to any implementation of the first aspect or the second aspect is performed.

According to an eleventh aspect, at least one embodiment further provides a chip system, which includes a processor, configured to perform the method according to any implementation of the first aspect or the second aspect.

According to a twelfth aspect, at least one embodiment further provides a communication system. The communication system includes a communication apparatus configured to perform any implementation of the first aspect and a communication apparatus configured to perform any implementation of the second aspect.

DESCRIPTION OF EMBODIMENTS

Figure 1:
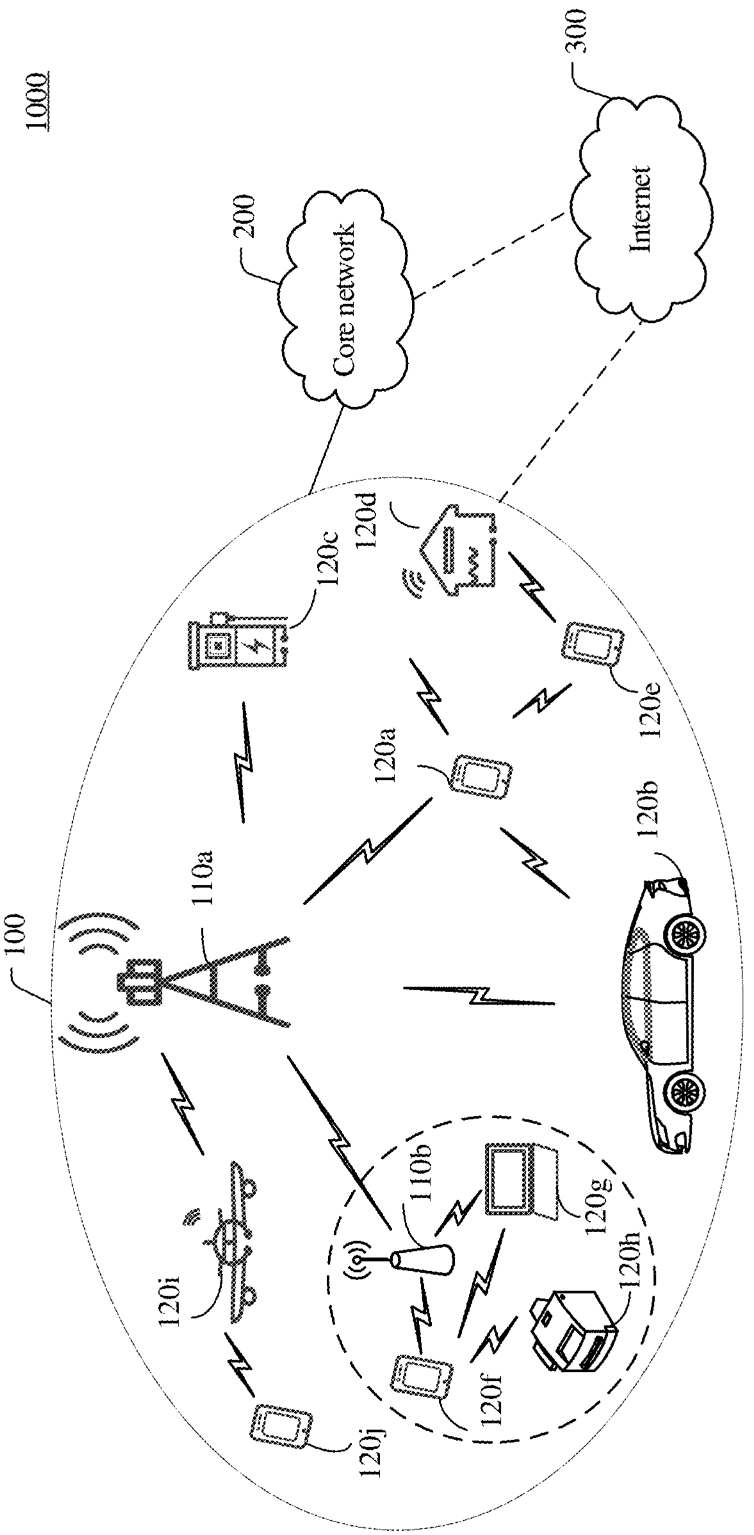
FIG. 1 is a schematic diagram of an architecture of a communication system according to at least one embodiment.

FIG. 1 is a schematic diagram of an architecture of a communication system 1000 to which at least one embodiment is applied. As shown in FIG. 1, the communication system includes a radio access network 100 and a core network 200. Optionally, the communication system 1000 further includes an internet 300. The radio access network 100 includes at least one radio access network device (for example, 110*a* and 110*b* in FIG. 1), and at least one terminal (for example, 120*a* to 120*j* in FIG. 1). A terminal is connected to a radio access network device in a wireless manner, and the radio access network device is connected to the core network in a wireless or wired manner. A core network device and the radio access network device is different independent physical devices, or functions of the core network device and logical functions of the radio access network device is integrated into one physical device, or some functions of the core network device and some functions of the radio access network device is integrated into one physical device. Terminals is connected in a wired or wireless manner, and radio access network devices is connected in a wired or wireless manner. FIG. 1 is merely a schematic diagram. The communication system further includes another network device, for example, a wireless relay device and a wireless backhaul device, which are not shown in FIG. 1.

The radio access network device is a base station, an evolved base station (eNodeB), a transmission/reception point (TRP), a next generation base station (gNB) in a 5G mobile communication system, a next generation base station in a sixth generation (6G) mobile communication system, a base station in a future mobile communication system, an access node in a wireless fidelity (Wi-Fi) system, or the like. Alternatively, the radio access network device is a module or a unit that completes some functions of a base station, for example, a central unit (CU) or a distributed unit (DU). The radio access network device is a macro base station (for example, 110*a* in FIG. 1), a micro base station or an indoor base station (for example, 110*b* in FIG. 1), a relay node, a donor node, or the like. A specific technology and a specific device form used by the radio access network device are not limited in at least one embodiment. For ease of description, the following is described by using a base station as an example of the radio access network device.

The terminal is also referred to as a terminal device, user equipment (UE), a mobile station, a mobile terminal, or the like. A terminal is widely applied to various scenarios such as device-to-device (D2D) communication, vehicle-to-everything (V2X) communication, machine-type communication (MTC), internet of things (IoT), virtual reality, augmented reality, industrial control, autonomous driving, telemedicine, smart grid, smart furniture, smart office, smart wearable, smart transportation, and smart city. The terminal is a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form used by the terminal are not limited in at least one embodiment.

The base station and the terminal is located at fixed positions, or is mobile. The base station and the terminal is deployed on land, including indoor or outdoor, is handheld, or is vehicle-mounted; is deployed on a water surface; or is deployed on an airplane, a balloon, and a satellite in the air. Application scenarios of the base station and the terminal are not limited in this embodiment of this application.

Roles of the base station and the terminal is relative to each other. For example, a helicopter or an unmanned aerial vehicle 120*i* in FIG. 1 is configured as a mobile base station. For the terminal 120*j* that accesses the radio access network 100 through 120*i*, the terminal 120*i* is a base station. However, for the base station 110*a*, the terminal 120*i* is a terminal in response to 110*a* and 120*i* communicating with each other by using a wireless air interface protocol. Certainly, 110*a* and 120*i* alternatively communicate with each other by using an interface protocol between base stations. In this case, for 110*a*, 120*i* is a base station. Therefore, both the base station and the terminal is collectively referred to as communication apparatuses. 110*a* and 110*b* in FIG. 1 is referred to as communication apparatuses having a base station function, and 120*a* to 120*j* in FIG. 1 is referred to as communication apparatuses having a terminal function.

Communication between the base station and the terminal, between base stations, or between terminals is performed by using a licensed spectrum, an unlicensed spectrum, or both a licensed spectrum and an unlicensed spectrum. Communication is performed by using a spectrum below 6 gigahertz (GHz), a spectrum above 6 GHz, or a spectrum above 6 GHz. A spectrum resource used for wireless communication is not limited in at least one embodiment.

In at least one embodiment, a function of the base station is alternatively performed by a module (for example, a chip) of the base station or a control subsystem that includes a base station function. The control subsystem that includes a base station function is a control center in application scenarios, such as smart grid, industrial control, smart transportation, and smart city. A function of the terminal alternatively is performed by a module (for example, a chip or a modem) of the terminal or an apparatus that includes a terminal function.

In at least one embodiment, the base station sends a downlink signal or downlink information to the terminal, where the downlink information is carried on a downlink channel. The terminal sends an uplink signal or uplink information to the base station, where the uplink information is carried on an uplink channel. To communicate with the base station, the terminal needs to establish a wireless connection to a cell controlled by the base station. The cell that establishes a wireless connection to the terminal is referred to as a serving cell of the terminal. In response to the terminal communicating with the serving cell, the terminal is further interfered by a signal from a neighboring cell.

In at least one embodiment, a time domain symbol is an orthogonal frequency division multiplexing (OFDM) symbol or a discrete Fourier transform spread OFDM (DFT-s-OFDM) symbol. Unless otherwise specified, symbols in embodiments of this application all are time domain symbols.

In at least one embodiment, a physical downlink shared channel (PDSCH), a physical downlink control channel (PDCCH), a physical uplink shared channel (PUSCH), and a physical broadcast channel (PBCH) are merely used as examples of a downlink data channel, a downlink control channel, an uplink data channel, and a broadcast channel, respectively. The data channel, the control channel, and the broadcast channel has different names in different systems and different scenarios. This is not limited in embodiments of this application.

In a 4G LTE system, basic system parameter design, frame structure design, and signal time-frequency resource design are relatively fixed. Specifically:

First, in terms of basic system parameter design and frame structure design, the 4G LTE system supports only a fixed subcarrier spacing (SCS) of 15 kHz (kHz). One radio frame includes subframes, and for a normal cyclic prefix, each subframe includes 14 OFDM symbols (referred to as symbols below). A time domain scheduling granularity is one subframe. Only limited types of carrier bandwidths are supported, specifically including six types of bandwidths: 1.4 megahertz (MHz), 3 MHz, 5 MHz, 10 MHz, 15 MHz, and 20 MHz. A frequency scheduling granularity is 12 subcarriers, that is, a bandwidth of one resource block (RB). The RB is a basic time-frequency scheduling unit, and specifically includes a time-frequency resource having one subframe in time domain and 12 subcarriers in a frequency domain. One subcarrier in one symbol is a minimum time-frequency resource, and is referred to as a resource element (RE), that is, one RB includes 12×14 Res.

Figure 2:
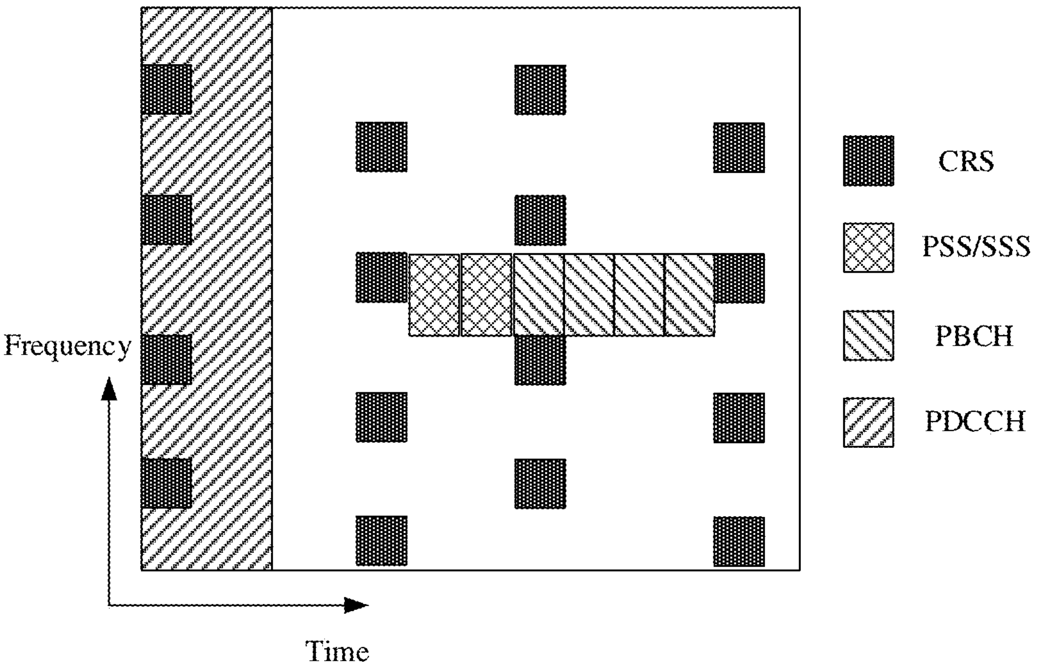
FIG. 2 is a schematic diagram of time-frequency resource positions of signals/channels in a 4G LTE system.

Second, in terms of signal time-frequency resource design, a signal used for initial access in one subframe is located in a bandwidth of six RBs that are located in the center of a carrier, and the signal includes a primary synchronization signal (PSS), a secondary synchronization signal (SSS), and a PBCH. FIG. 2 is a schematic diagram of time-frequency resource positions of signals/channels in a 4G LTE system. The terminal obtains a carrier bandwidth only after the terminal receives a PBCH. A PSS transmission period and an SSS transmission period are five subframes, and a PBCH transmission period is 10 subframes. Regardless of whether there is data transmission, a cell-specific reference signal (CRS) needs to be sent on each RB in each subframe for functions such as measurement, channel estimation, demodulation, and time-frequency tracking. A PDCCH is used for scheduling uplink and downlink data channels and common information. Specifically, the PDCCH is scattered on an entire carrier bandwidth in a time-frequency interleaving manner, and is located in the first n symbols of a subframe in time domain, where n is one of natural numbers 1 to 4. In at least one embodiment, the common information includes a system information block (SIB), a random access channel (random access channel, RACH) response, a paging message, and the like.

In a 5G NR system, basic system parameter design, frame structure design, and signal time-frequency resource design are relatively flexible. Specifically:

First, in terms of basic system parameter design and frame structure design, the 5G NR system supports a plurality of SCSs. Specifically, for a frequency range 1 (generally considered 6 GHz or below 6 GHz), 15 kHz, 30 kHz, and 60 kHz SCSs are supported; and for a frequency range 2 (generally considered above 6 GHz), 60 kHz and 120 kHz SCSs are supported. One radio frame includes 10 subframes, and duration of each subframe is 1 millisecond (ms). In the NR system, a time domain scheduling granularity is defined as a slot, and for a normal cyclic prefix, each slot includes 14 OFDM symbols (referred to as symbols below). Therefore, for different SCSs, one subframe includes different quantities of slots. For example, for a 15 kHz SCS, one subframe includes one slot; and for a 30 kHz SCS, one subframe includes two slots, and duration of each slot is 0.5 ms. The NR communication system supports flexible carrier bandwidths. To be specific, carrier bandwidths are not limited to a limited quantity of carrier bandwidths in the LTE system, and a basic scheduling granularity in frequency domain is also 12 subcarriers.

Second, in terms of signal time-frequency resource design, a signal used for initial access in the NR system is referred to as a synchronization signal/broadcast channel block (SSB), and the SSB includes a PSS, an SSS, and a PBCH. The SSB has a flexible frequency domain position in a carrier. In other words, the SSB does not need to be limited to being located in the center of a carrier, unlike that in the LTE system. The concept of bandwidth part (BWP) is introduced to the NR system, to decouple a system-level carrier from a terminal-level BWP. For example, the NR system supports a carrier with a bandwidth of 100 MHz, but the terminal supports only a 20 MHz BWP. In terms of a time domain period, the NR supports a plurality of SSB transmission periods. In an initial access phase, the terminal assumes that an SSB transmission period is 20 ms, namely, duration of two radio frames. To improve coverage, a beamforming mechanism is introduced for a common channel in the NR system, and omnidirectional coverage is implemented by sending a plurality of SSBs through beam sweeping. In addition, in the NR system, signal transmission that always exists is cancelled (for example, in the LTE system, regardless of whether data transmission exists, the CRS needs to be sent on each RB in each subframe all the time). Instead, function decoupling is used to introduce a reference signal (RS) of a corresponding function. For example, an SSS or a channel state information reference signal (CSI-RS) is used for higher layer measurement, a CSI-RS is used for channel estimation, and a demodulation reference signal (DMRS) is used for demodulation. An RS of each function is configured and sent. The PDCCH is still used for scheduling uplink and downlink data channels and common information, but the PDCCH does not need to be scattered on the entire carrier bandwidth in the time-frequency interleaving manner. Instead, the PDCCH is sent in frequency domain resources of some RBs in the carrier. These RBs are referred to as a control resource set (CORESET). A detection position of the PDCCH in time domain is determined by a search space configuration, and unlike the LTE system, the PDCCH does not need to be detected in each subframe.

In conclusion, compared with the 4G LTE, the 5G NR communication system provides more flexible system design, including basic parameter design, frame structure design, channel time-frequency resource design, and the like, to better support forward compatibility and scalability.

In the NR system, an initial access procedure of the terminal mainly includes:

First, the terminal detects a PSS and an SSS to achieve time-frequency synchronization with the NR system, and obtains a physical cell identifier.

Then, the terminal receives a master information block (MIB) in a PBCH, and obtains system information of the NR system, including an initial BWP and a time-frequency resource configuration (including resource configurations of a frequency domain CORESET and a time domain search space) of a PDCCH for scheduling a common channel, and the like.

Then, the terminal receives a SIB 1 and obtains system information except system information in the MIB, including a RACH configuration, a time division duplexing (TDD) frame structure configuration, and the like.

Then, the terminal detects a system paging message or sends a random access signal to establish a radio resource control (RRC) connection with the base station.

After the RRC connection is successfully established, the terminal and the base station transmits data properly.

Figure 3:
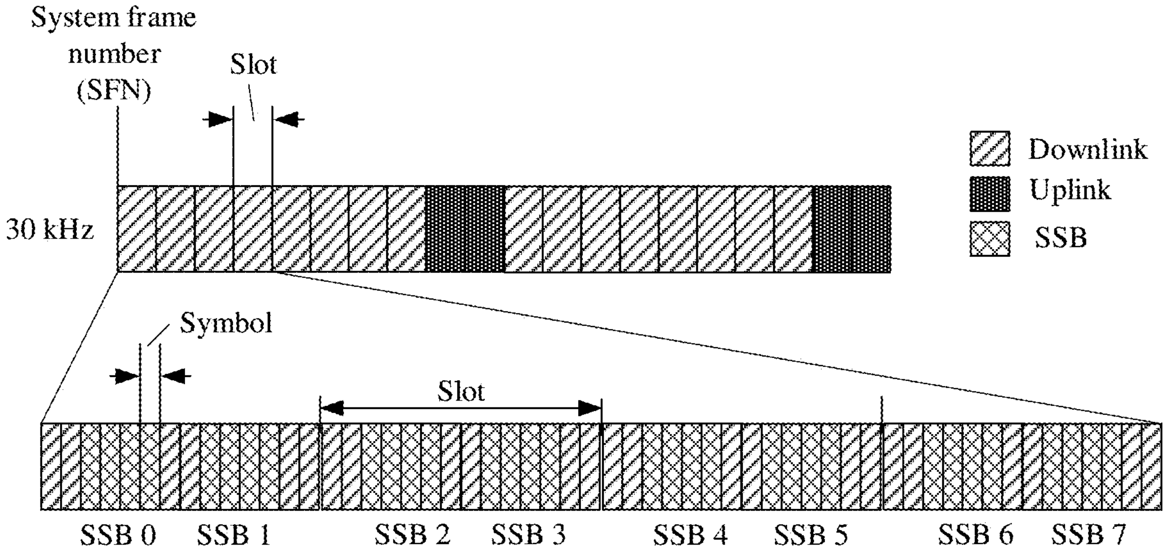
FIG. 3 is a schematic diagram of resource positions of SSBs in a 5G NR system.

To implement omnidirectional coverage of a common channel for initial access, the beamforming mechanism is used in the NR. A plurality of SSBs are sent in a plurality of beam directions in a time division multiplexing (TDM) manner. This transmission manner is also referred to as a transmission manner of beam sweeping. A plurality of to-be-sent SSBs use a resource multiplexing manner of TDM, and each SSB has a fixed resource position. FIG. 3 is a schematic diagram of resource positions of SSBs in a 5G NR system. In an SSB period, a set of SSB beams is sent in a TDM manner. The SSB beams in the set are represented by using SSB index numbers. For example, in an NR system in which a frequency band of 3 GHz to 6 GHz is deployed, the set of SSBs includes eight SSB beams whose SSB indexes are #0, #1, . . . , and #7. The SSB has a relatively flexible position in frequency domain, and only needs to be on a predefined frequency grid. For a time domain position, the set of SSBs is located in the first half-frame of a radio frame, and each SSB has a fixed position in time domain. Refer to FIG. 3. A 30-kHz SCS is used as an example. The eight SSBs are located in the first four slots of the first half-frame, and positions of specific symbols are fixed positions shown in FIG. 3. Beam transmission directions of the plurality of sent SSBs are different, and the plurality of SSBs are sent based on a fixed sequence. The eight SSBs shown in FIG. 3 are used as an example. Beam directions of an SSB 0 to an SSB 7 are a direction 1 to a direction 8, respectively. In response to the eight SSBs being sent, a sending sequence is: sending the SSB 0 in the direction 1, sending the SSB 1 in the direction 2, sending the SSB 2 in the direction 3, sending the SSB 3 in the direction 4, sending the SSB 4 in the direction 5, sending the SSB 5 in the direction 6, sending the SSB 6 in the direction 7, and sending the SSB 7 in the direction 8. Therefore, each of the plurality of SSBs occupies a fixed resource, and the base station sends beams of the plurality of SSBs on corresponding resources based on fixed directions.

Figure 4:
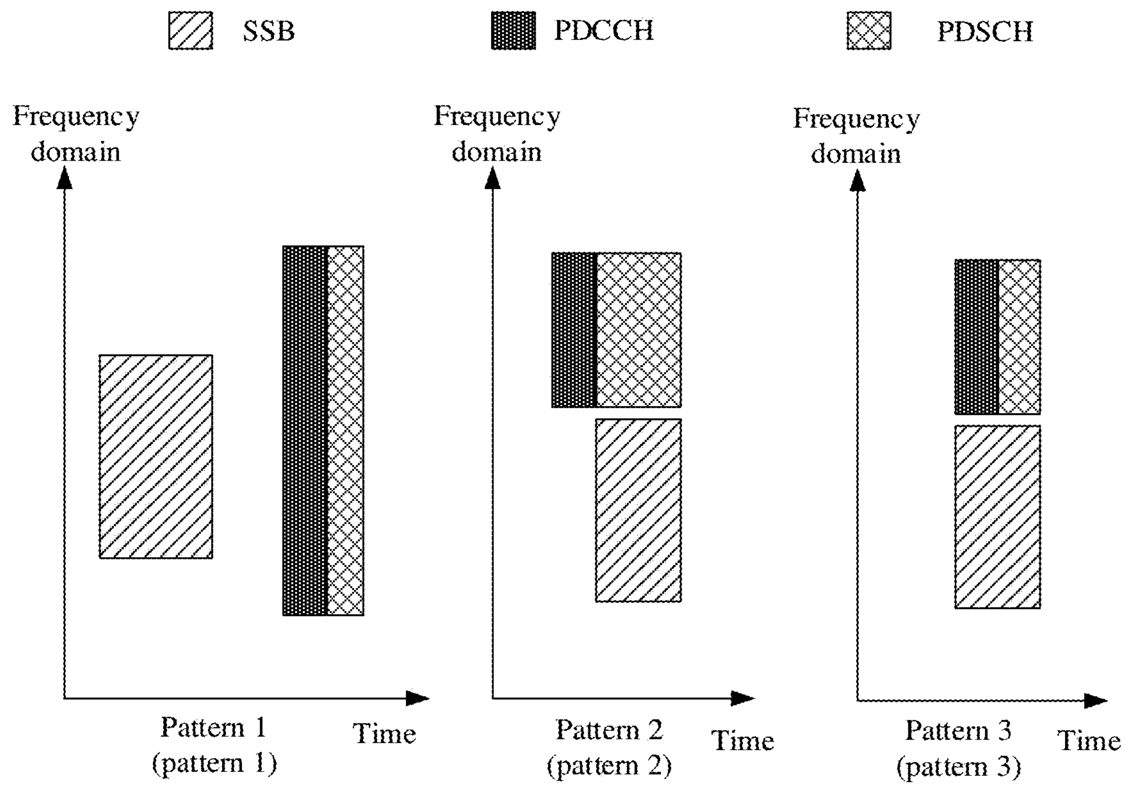
FIG. 4 is a schematic diagram of resource multiplexing manners of SSBs and initial common PDCCHs in a 5G NR system.

In addition to SSBs that are sent in the sending manner of beam sweeping, a common PDCCH used to schedule a common channel (for example, the SIB 1, another SIB, or a paging message) in the initial access phase is sent in a beam sweeping manner. A time-frequency resource of the common PDCCH is jointly determined by a CORESET in frequency domain and a search space in time domain. FIG. 4 is a schematic diagram of resource multiplexing manners of SSBs and initial common PDCCHs in a 5G NR system. A PDCCH is used to schedule a channel carrying a SIB. For a frequency range 1 (FR 1), the NR supports only TDM of SSBs and PDCCHs, namely, a pattern 1. For a frequency range 2 (FR 2), the NR system supports the TDM or frequency division multiplexing (FDM) manner of the SSBs and the PDCCHs. The FDM is further classified into a pattern 2 and a pattern 3. The FR 1 is from 450 MHz to 6000 MHz, and the FR 2 is from 24250 MHz to 52600 MHz.

Figure 5:
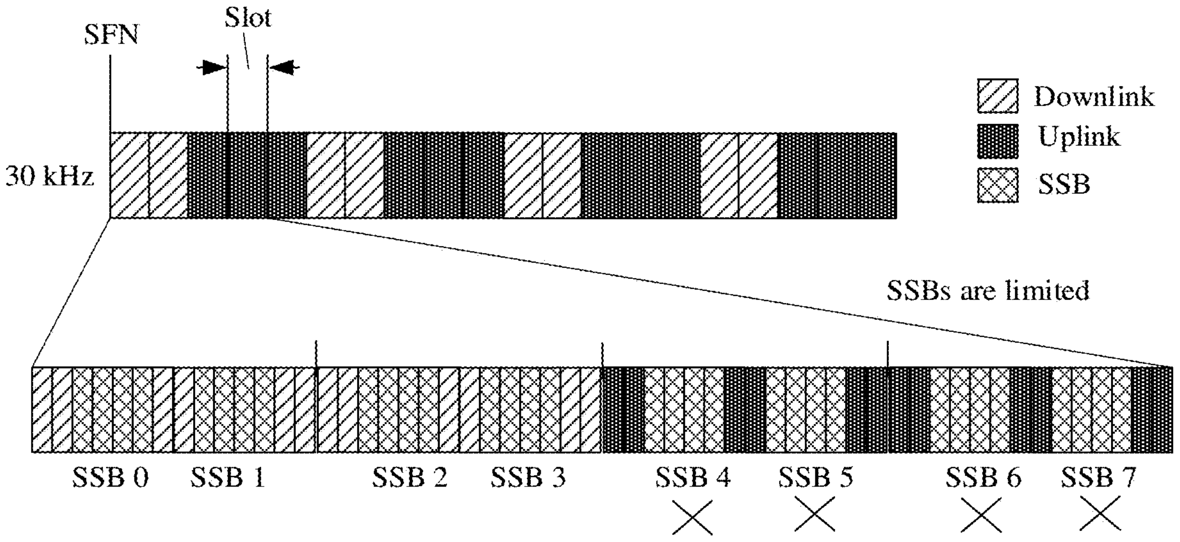
FIG. 5 is a schematic diagram of a UL-dominant TDD configuration for which an SSB beam sweeping mechanism of TDM is not suitable.

Based on the foregoing described initial access mechanism of the NR system, TDM is supported for SSB beam sweeping, and there is a fixed correspondence between an SSB beam sweeping manner and a frame structure. In other words, resource multiplexing manners of a plurality of sent SSBs are fixed. Consequently, the SSB beam sweeping manner of TDM cannot adapt to various TDD configurations. This is because downlink (DL) slots are dominant in current commercial TDD configurations. In other words, the quantity of DL slots is greater than the quantity of uplink (UL) slots in the TDD configurations. However, in the future, in consideration of a UL-dominant service usage such as video uploading, a TDD configuration is UL slot-dominant. In this case, with the SSB beam sweeping solution of TDM, SSB beam sweeping cannot be completed with limited DL slot resources, which restricts a beam sweeping capability in initial access. FIG. 5 is a schematic diagram of a UL-dominant TDD configuration for which an SSB beam sweeping mechanism of TDM is not suitable. A slot configuration ratio in the TDD configuration is: DL:UL=2:3. In the TDD configuration, two slots of the first four slots are uplink slots. However, sending eight SSBs involves the first four slots in a radio frame being downlink slots. Therefore, in the TDD configuration, a maximum of four SSBs, namely, an SSB 0 to an SSB 3 in FIG. 5, is sent, and an SSB 4 to an SSB 7 in FIG. 5 cannot be sent.

Therefore, how to adapt to various TDD configurations to send a common signal such as an SSB is a problem to be resolved in at least one embodiment.

To resolve the problem, a plurality of common signal transmission manners are introduced in at least one embodiment. Each common signal transmission manner corresponds to one common signal set, one common signal set includes a plurality of common signals, and one common signal transmission manner indicates a resource multiplexing manner of a plurality of common signals in the common signal set corresponding to the common signal transmission manner. The resource multiplexing manner is TDM, FDM, or both TDM and FDM. Different common signal transmission manners correspond to different resource multiplexing manners. Each TDD configuration corresponds to one or more common signal transmission manners, and each common signal transmission manner corresponds to one TDD configuration. A base station sends a plurality of common signals in a common signal set to a terminal based on a common signal transmission manner corresponding to the common signal set. The terminal detects one or more of the plurality of common signals, and obtain information such as a synchronization signal from the detected common signal. In at least one embodiment, unless otherwise specified, "set" is short for "common signal set", and "common signal transmission manner" and "common signal resource multiplexing manner" are interchangeable.

In an implementation, in response to being classified by resource multiplexing manners, different sets corresponding to different common signal transmission manners includes one or more of the following sets:

(a) Set that Uses Time Division Multiplexing (TDM)

To be specific, resource multiplexing manners of common signals in the set are time division multiplexing, or transmission manners of all the common signals in the set are time division multiplexing.

(b) Set that Uses Frequency Division Multiplexing (FDM)

To be specific, resource multiplexing manners of common signals in the set are frequency division multiplexing, or transmission manners of all the common signals in the set are frequency division multiplexing.

(c) Set that Uses Frequency Division Multiplexing and Time Division Multiplexing To be specific, resource multiplexing manners of common signals in the set are frequency division multiplexing and time division multiplexing, or transmission manners of the common signals in the set are frequency division multiplexing and time division multiplexing.

For example, there is a second set in the foregoing plurality of sets, and a resource multiplexing manner of a common signal in the second set is time division multiplexing. In this case, the second set is a set of the type (a). For another example, there is a third set in the foregoing plurality of sets, and resource multiplexing manners of two common signals in the third set are frequency division multiplexing. In this case, the third set is a set of the type (b) or the type (c). In response to resource multiplexing manners of all common signals in the third set being frequency division multiplexing, the third set is a set of the type (b). In response to resource multiplexing manners of some common signals in the third set being frequency division multiplexing and resource multiplexing manners of some common signals in the third set are time division multiplexing, the third set is a set of the (c) type.

Optionally, there is a fourth set in the foregoing plurality of sets, and resource multiplexing manners of two common signals in the fourth set are frequency division multiplexing. In this case, the fourth set is a set of the type (b) or the (c) type. In addition, a minimum frequency domain distance between the two common signals in the fourth set that use frequency division multiplexing is different from a minimum frequency domain distance between the two common signals in the third set that use frequency division multiplexing. For example, the minimum frequency domain distance between the two common signals that use frequency division multiplexing in the third set is a first distance, the minimum frequency domain distance between the two common signals that use frequency division multiplexing in the fourth set is a second distance, and the first distance is different from the second distance. The first distance and second distance is predefined in a protocol, preconfigured by a base station, or preconfigured by another network device.

Figure 6:
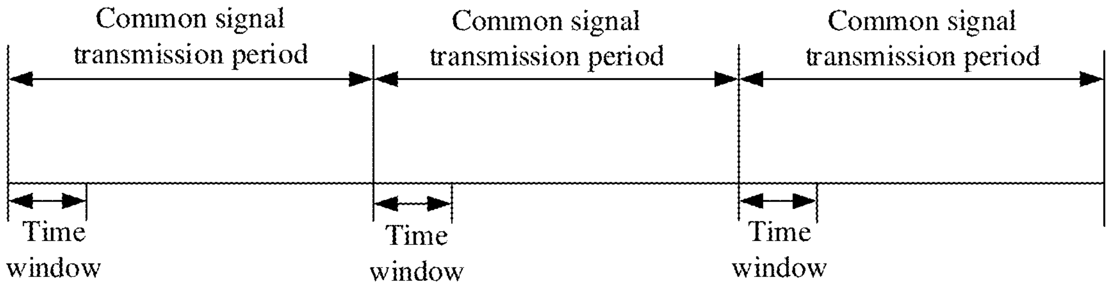
FIG. 6 is a schematic diagram of a relationship between a common signal transmission period and a time window.

In an implementation, in response to being classified by transmission time, a plurality of sets corresponding to a plurality of common signal transmission manners includes one or more of the following sets:

(d) Set in which all Common Signals in the Set are Located in One Periodic Time Window A common signal is sent periodically, and there is a time window in duration of each period. FIG. 6 is a schematic diagram of a relationship between a common signal transmission period and a time window. For example, a common signal transmission period is 20 ms, and there is a time window in each 20 ms, for example, 5 ms or N slots. All common signals in the set are sent in the time window.

In the solution, all common signals in a set are sent in a time window of a common signal transmission period. For example, there is a fifth set in the foregoing plurality of sets, and common signals in the fifth set are located in one periodic time window.

(e) Set in which a First Part of Common Signals and a Second Part of Common Signals are Located in Different Periodic Time Windows In the solution, common signals in a set are sent in different time windows of a plurality of common signal transmission periods. For example, there is a sixth set in the foregoing plurality of sets, and common signals in the sixth set are classified into three parts, which are separately sent in time windows of three common signal transmission periods; or the common signals in the sixth set are classified into two parts, which are separately sent in time windows of two common signal transmission periods.

A set in the foregoing plurality of sets is a set of the type (a), the type (b), the (c) type, the type (d), or the type (e). For example, there is a seventh set, and resource multiplexing manners of common signals in the seventh set are time division multiplexing, and the common signals in the seventh set are located in one periodic time window. For another example, there is an eighth set, and resource multiplexing manners of two common signals in the eighth set are frequency division multiplexing, and a first part of common signals and a second part of common signals in the eighth set are located in different periodic time windows.

Figure 7A:
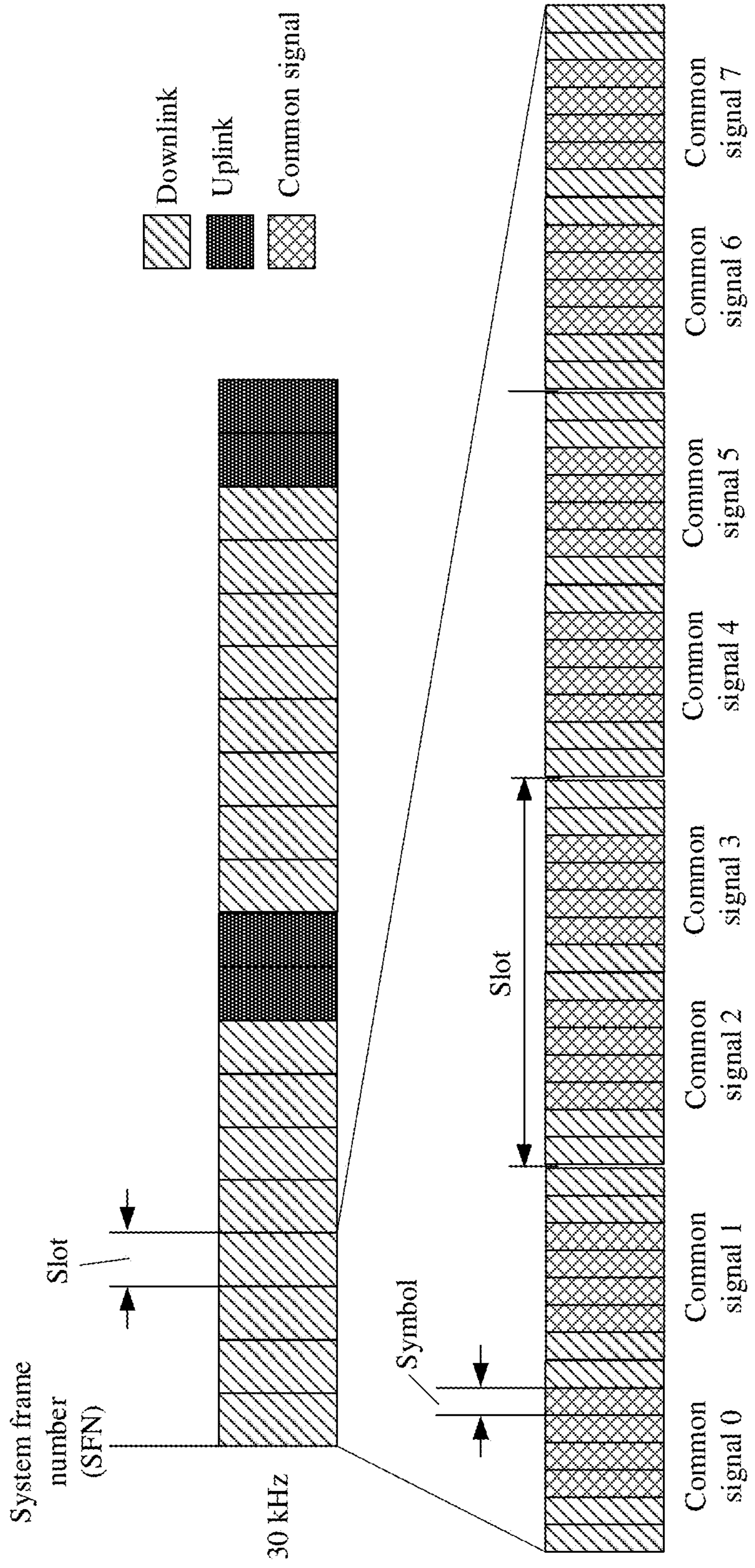
FIG. 7(*a*) to FIG. 7(*c*) are schematic diagrams of common signal transmission manners.
Figure 7B:
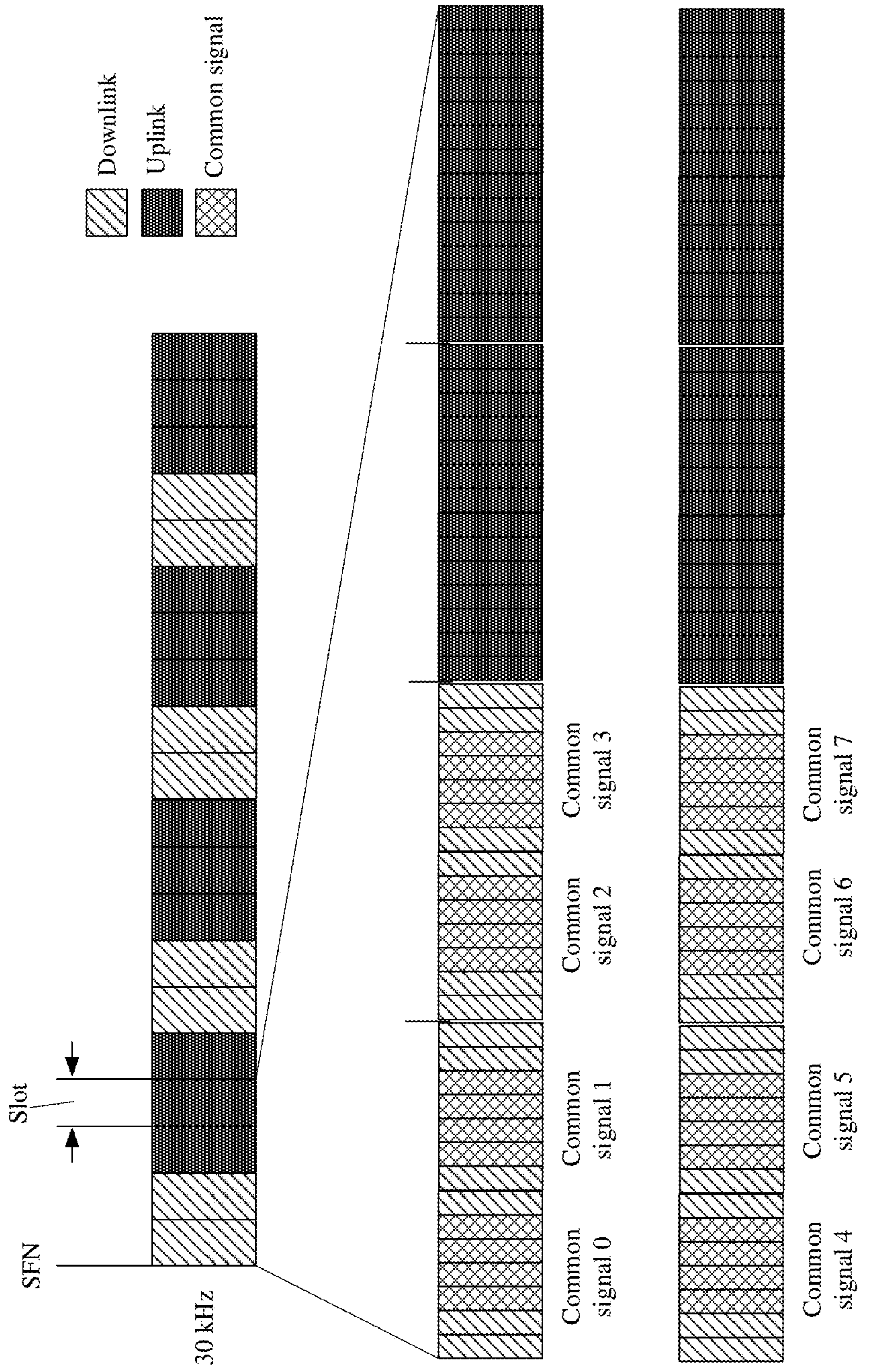
Figure 7C:
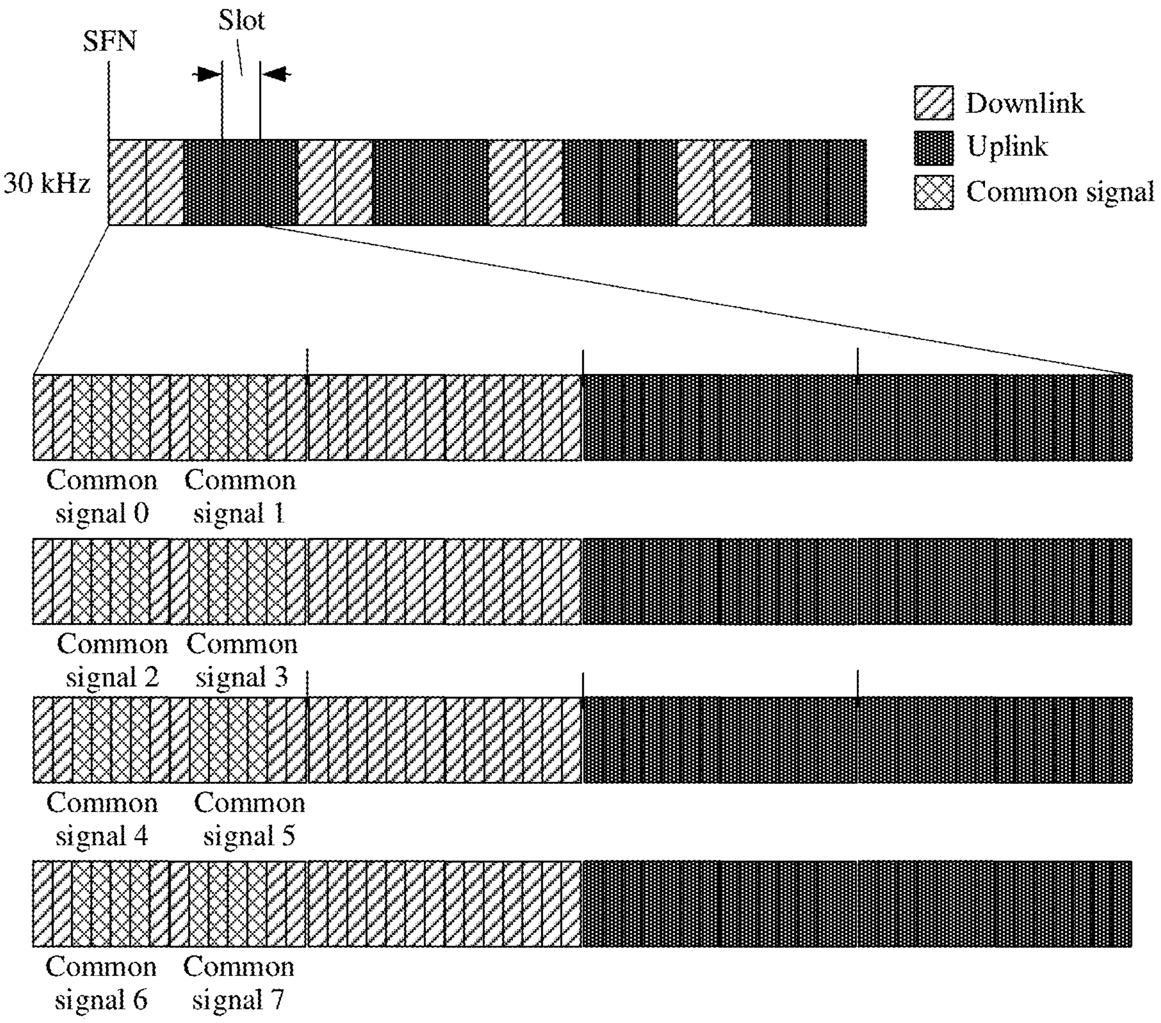

For example, FIG. 7(*a*) to FIG. 7(*c*) are schematic diagrams of common signal transmission manners. In FIG. 7(*a*), the common signal transmission manner is TDM. In FIG. 7(*b*) and FIG. 7(*c*), the common signal transmission manners are TDM and FDM.

A set formed by eight common signals in FIG. 7(*a*) is referred to as a set 1. A common signal transmission manner corresponding to the set 1 is: time division multiplexing of a common signal 0 to a common signal 7. Therefore, the common signal 0 to the common signal 7 occupy same frequency domain resources but different time domain resources.

A set formed by eight common signals in FIG. 7(*b*) is referred to as a set 2. Common signal transmission manners corresponding to the set 2 are: time division multiplexing of a common signal 0 to a common signal 3, time division multiplexing of a common signal 4 to a common signal 7, frequency division multiplexing of the common signal 0 and the common signal 4, frequency division multiplexing of a common signal 1 and a common signal 5, frequency division multiplexing of a common signal 2 and a common signal 6, and frequency division multiplexing of the common signal 3 and the common signal 7. That is, the common signal 0 to the common signal 3 have same frequency domain resources but different time domain resources, the common signal 4 to the common signal 7 have same frequency domain resources but different time domain resources, the common signal 0 and the common signal 4 have same time domain resources but different frequency domain resources, the common signal 1 and the common signal have same time domain resources but different frequency domain resources, the common signal 2 and the common signal 6 have same time domain resources but different frequency domain resources, and the common signal 3 and the common signal 7 have same time domain resources but different frequency domain resources.

A set formed by eight common signals in FIG. 7(*c*) is referred to as a set 3. Common signal transmission manners corresponding to the set 3 are: time division multiplexing of a common signal 0 and a common signal 1, time division multiplexing of a common signal 2 and a common signal 3, time division multiplexing of a common signal 4 and a common signal 5, time division multiplexing of a common signal 6 and a common signal 7, frequency division multiplexing of the common signal 0, the common signal 2, the common signal 4, and the common signal 6, and frequency division multiplexing of the common signal 1, the common signal 3, the common signal 5, and the common signal 7.

Different sets correspond to a same beam sweeping transmission manner or different beam sweeping transmission manners. For example, beam sweeping manners of the eight common signals in the set 1, the set 2, and the set 3 are: the common signal 0 to the common signal 7 are sent in a beam direction 1 to a beam direction 8, respectively. For another example, beam sweeping manners of the eight common signals in the set 1 and the set 2 are: the common signal 0 to the common signal 7 are sent in the beam direction 1 to the beam direction 8, respectively; and beam sweeping manners of the eight common signals in the set 3 are: the common signal 0 to the common signal 7 are sent in a beam direction 9 to a beam direction 16, respectively.

Implementations of a first common signal and a second common signal in at least one embodiment include but are not limited to the following:

Implementation 1: The first common signal includes a synchronization signal and a broadcast channel, and the second common signal includes a control channel or a channel carrying system information.

Optionally, the synchronization signal includes a PSS and an SSS. The broadcast channel is a PBCH, used to carry a MIB. The control channel is a PDCCH, used to schedule the channel carrying system information. The system information includes a SIB, and the SIB herein includes a SIB 1.

Implementation 2: The first common signal includes a synchronization signal, and the second common signal includes a control channel or a channel carrying system information.

Optionally, the synchronization signal includes a PSS and an SSS. The control channel is a PDCCH, used to schedule the channel carrying system information. The system information is minimum system information. The minimum system information includes a MIB and a SIB, and the SIB herein includes a SIB 1. The MIB or the SIB herein has another name in future technology evolution.

A first channel in at least one embodiment is the broadcast channel, the channel carrying system information, or the control channel. This is described together herein, and details are not described again.

The communication method provided in at least one embodiment is performed by a terminal or a component (such as a chip or an apparatus) used for the terminal, and a base station or a component (such as a chip or an apparatus) used for the base station. For ease of description, in the following description, an example in which a terminal and a base station perform the method is used for description.

Figure 8:
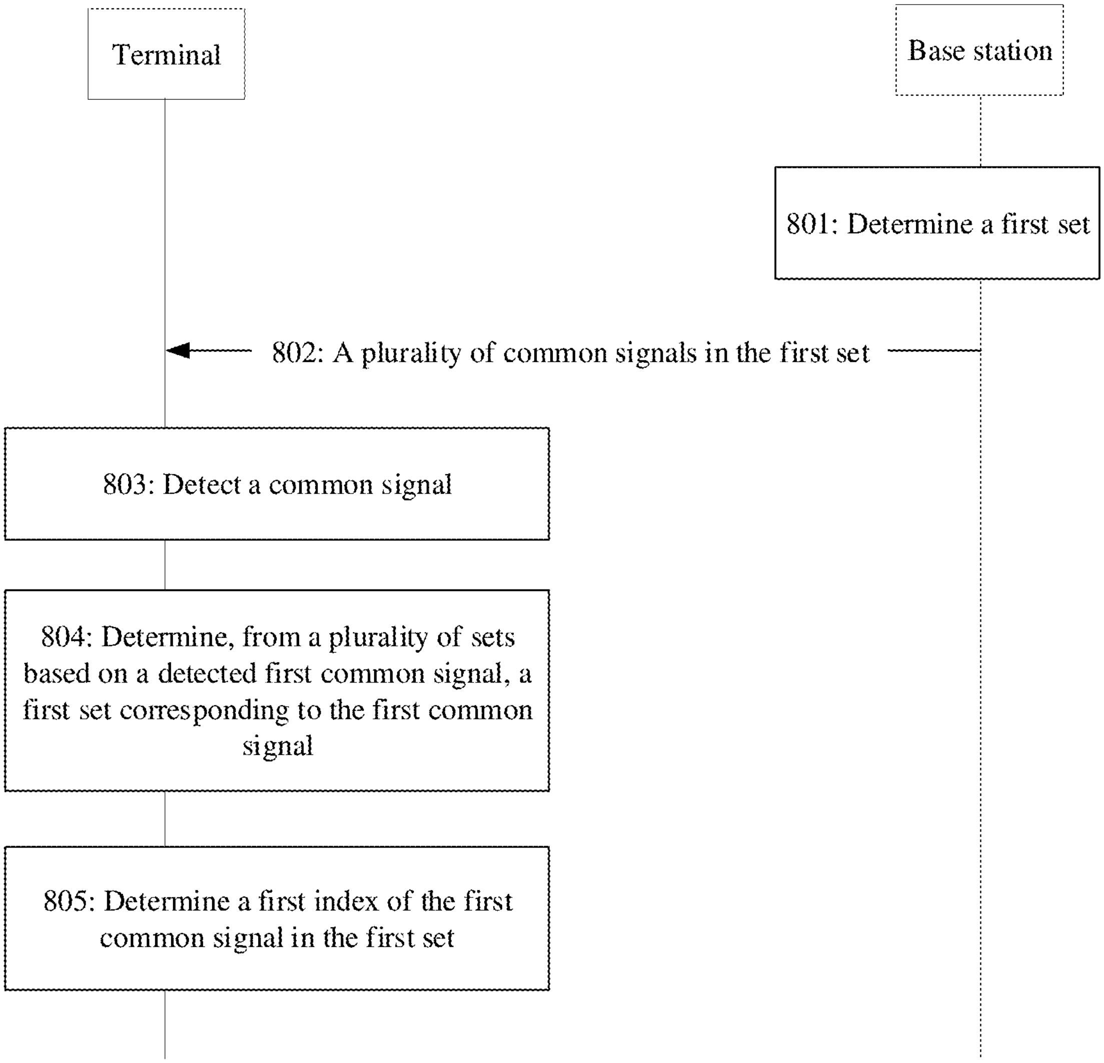
FIG. 8 is a schematic diagram of a wireless communication method according to at least one embodiment.

FIG. 8 is a schematic diagram of a wireless communication method according to at least one embodiment. The method includes the following operations.

801: The base station determines a first set.

The first set is one of a plurality of sets, the first set includes a plurality of common signals, and resource multiplexing manners of the plurality of common signals include time division multiplexing and/or frequency division multiplexing. The plurality of sets herein is a plurality of sets corresponding to the foregoing described plurality of common signal transmission manners. The plurality of sets is classified into sets of the foregoing type (a) to type (c) based on resource multiplexing manners. Alternatively, the plurality of sets is classified into sets of the foregoing type (d) and type (e) based on transmission time.

The first set is one of the second set, the third set, the fourth set, the fifth set, the sixth set, the seventh set, or the eighth set.

802: The base station sends a plurality of common signals in the first set to the terminal.

803: The terminal detects the common signal.

For example, the terminal detects the common signal sent by the base station, and detects a first common signal in the first set. The first common signal includes a synchronization signal.

In an implementation, in the foregoing step 803, the terminal detects the synchronization signal based on a candidate sequence of the synchronization signal and a corresponding SCS. The candidate sequence is predefined by a standard, for example, a PSS candidate sequence or an SSS candidate sequence is used, or a candidate sequence is predefined for each frequency band. Candidate sequences corresponding to different frequency bands is the same or different. For example, a frequency band 1 uses a first candidate sequence, and a frequency band 2 uses a second candidate sequence.

The SCS of the synchronization signal is associated with a frequency band. For example, the frequency band 1 uses SCSs of 15 kHz and 30 kHz, and the frequency band 2 uses SCSs of 120 kHz and 240 kHz. For another example, all frequency bands use one SCS or one SCS set.

By detecting the candidate SCS and the candidate sequence, the terminal detects a synchronization signal. For example, a synchronization signal whose SCS is 30 kHz is detected on the frequency band 1.

After the synchronization signal is detected, the terminal receives a broadcast channel, and an SCS of the broadcast channel is the same as or have an association relationship with that of the synchronization signal. A time-frequency resource of the broadcast channel also has an association relationship with a time-frequency resource of the synchronization signal, for example, they are on a same symbol or adjacent symbols, or on a same RB or adjacent RBs.

804: The terminal determines, from a plurality of sets based on the detected first common signal, a first set corresponding to the first common signal.

Each of the plurality of sets corresponds to a common signal transmission manner. In other words, each set corresponds to a resource multiplexing manner. For details, refer to the foregoing description.

The obtained first set herein is a set that is determined by the terminal from a plurality of sets and corresponds to the detected first common signal. In other words, the terminal identifies a currently used common signal transmission manner.

The first set is one of the second set, the third set, the fourth set, the fifth set, the sixth set, the seventh set, or the eighth set.

805: The terminal determines a first index of the first common signal in the first set.

The first index corresponds to a resource of the first common signal, and the resource includes a time domain resource and/or a frequency domain resource. Alternatively, the terminal determines the resource of the first common signal based on the first index. The first index indicates an offset relative to a specific time point and/or an offset relative to a specific frequency domain position. The specific time point is a boundary of a radio frame, a boundary of a radio half-frame, or a boundary of a slot or subframe with a smallest number. The specific frequency domain position is a frequency boundary of a carrier or a bandwidth part in which the first common signal is located. Alternatively, the first index indicates an offset relative to a time domain resource and/or a frequency domain resource of another common signal in the first set, or indicate a number of the first common signal in the first set.

Based on the solution, the terminal determines, based on the detected first common signal, the first set corresponding to the first common signal, and further determines resource multiplexing manners of the plurality of common signals in the first set. According to the method, in response to the plurality of common signals being sent, the resource multiplexing manners of the plurality of common signals is configured more flexibly, so as to flexibly send the plurality of common signals. Because the resource multiplexing manners of the plurality of common signals in the set is flexibly configured, adaptation to various TDD configurations is implemented. For example, in response to downlink resources in a TDD configuration being insufficient, the plurality of common signals in the set is sent in a frequency division multiplexing manner as much as feasible. For another example, in response to the downlink resources in the TDD configuration being sufficient, the plurality of common signals in the set is sent in a time division multiplexing manner and/or a frequency division multiplexing manner. Therefore, the method helps improve communication efficiency.

In an implementation, after the foregoing operation 805, the terminal further determines a resource of a second common signal based on the first index, and receive the second common signal based on the resource of the second common signal. For a meaning of the second common signal, refer to the foregoing description. Details are not described again.

In an implementation, after the foregoing operation 805, the terminal determines a resource of a common signal other than the first common signal in the first set based on the first set and the first index. For example, the first set includes eight common signals: a common signal to a common signal 7, and the first common signal detected by the terminal is the common signal 3. After the terminal determines a resource of the common signal 3, the terminal further determines resources of the common signal 0 to the common signal 2 and the common signal 4 to the common signal 7 based on the first set, a first index of the common signal 3, and the resource of the common signal 3.

In at least one embodiment, the first set corresponding to the first common signal is determined from a plurality of sets based on any one of the following methods or a combination of any plurality of the following methods:

Method 1: A first set corresponding to a sequence of a synchronization signal is determined from the plurality of sets based on the sequence of the synchronization signal.

For example, a sequence 1 of the synchronization signal corresponds to a common signal set 1, a sequence 2 of the synchronization signal corresponds to a common signal set 2, and a sequence 3 of the synchronization signal corresponds to a common signal set 3. The synchronization signal sequence herein is a PSS sequence or an SSS sequence.

For another example, a PSS and SSS sequence combination 1 corresponds to the common signal set 1, a PSS and SSS sequence combination 2 corresponds to the common signal set 2, and a PSS and SSS sequence combination 3 corresponds to the common signal set 3.

Method 2: The first set is determined from the plurality of sets based on a first channel corresponding to the first common signal.

Optionally, the first set is determined from the plurality of sets based on one or more of the following pieces of information corresponding to the first channel: information indicating the first set, a scrambling code of the first channel, or a DMRS sequence of the first channel.

The information indicating the first set corresponds to a first field of the first channel. For example, the first field includes two bits. In this case, four sets is indicated. For example, one of "00", "01", "10", or "11" indicates the first set, and the other three bits indicate other sets.

The first channel has a plurality of scrambling codes. For example, a scrambling code 1 corresponds to the first set, and a scrambling code 2, a scrambling code 3, and the like respectively correspond to other sets. In response to the terminal obtaining the scrambling code 1 of the first channel, the first set is determined.

The first channel has a plurality of DMRS sequences. For example, a DMRS sequence 1 corresponds to the first set, and a DMRS sequence 2, a DMRS sequence 3, and the like respectively correspond to other sets. In response to the terminal obtaining the DMRS sequence 1 of the first channel, the first set is determined.

Method 3: A first set corresponding to a minimum carrier bandwidth capability supported by the terminal is determined from the plurality of sets based on the minimum carrier bandwidth capability supported by the terminal.

For example, a carrier bandwidth 1 corresponds to the first set, and a carrier bandwidth 2 and a carrier bandwidth 3 respectively correspond to other sets. In response to the minimum carrier bandwidth capability supported by the terminal being the carrier bandwidth 1, the terminal determines the first set from the plurality of sets.

Method 4: A first set corresponding to a frequency band in which the terminal operates is determined from the plurality of sets based on the frequency band in which the terminal operates.

For example, a frequency band 1 corresponds to the first set, and a frequency band 2 and a frequency band 3 respectively correspond to other sets. In response to the terminal currently operating in the frequency band 1, the terminal determines the first set from the plurality of sets.

Method 5: A first set corresponding to a subcarrier spacing of the first common signal is determined from the plurality of sets based on the subcarrier spacing of the first common signal.

For example, a subcarrier spacing 1 corresponds to the first set, and a subcarrier spacing 2 and a subcarrier spacing 3 respectively correspond to other sets. In response to the subcarrier spacing of the detected first common signal being the subcarrier spacing 1, the terminal determines the first set from the plurality of sets.

Method 6: A first set corresponding to a subcarrier spacing combination is determined from the plurality of sets based on the subcarrier spacing combination. The subcarrier spacing combination includes a first subcarrier spacing of the first common signal and a second subcarrier spacing of a channel corresponding to the first common signal. In other words, a subcarrier spacing of the first common signal is the first subcarrier spacing, and a subcarrier spacing of the channel corresponding to the first common signal is the second subcarrier spacing.

The channel corresponding to the first common signal is the first channel.

For example, a subcarrier spacing combination 1 corresponds to the first set, and a subcarrier spacing combination 2 and a subcarrier spacing combination 3 respectively correspond to other sets. In response to the subcarrier spacing combination of the detected first common signal being the subcarrier spacing combination 1, the terminal determines the first set from the plurality of sets.

Method 7: A first set corresponding to a TDD configuration is determined from the plurality of sets based on the TDD configuration.

Each TDD configuration indicates a ratio of an uplink time domain resource to a downlink time domain resource. The time domain resource herein includes at least one of a symbol, a slot, a subframe, or a radio frame.

For example, a TDD configuration 1 corresponds to the first set, and a TDD configuration 2 and a TDD configuration 3 respectively correspond to other sets. In response to the terminal determining that the current TDD configuration is the TDD configuration 1, the terminal determines the first set from the plurality of sets. Optionally, the terminal obtains the current TDD configuration from the detected first common signal.

Any two or more of the method 1 to the method 7 is used in combination, to determine, from the plurality of sets, the first set corresponding to the first common signal. For example, the terminal first determines, from a plurality of sets based on the TDD configuration in the method 7, two or more sets corresponding to the TDD configuration, and then determines, from the determined two or more sets based on the subcarrier spacing combination in the method 6, the first set corresponding to the subcarrier spacing combination. That is, two or more sets is determined according to any one of the methods, and then a set is further determined from the two or more sets with reference to one or more other methods. One set is determined finally, and the set is the first set corresponding to the first common signal.

In at least one embodiment, the first index of the first common signal in the first set is determined according to any one of the following methods:

Method 1: The first index of the first common signal in the first set is determined based on a sequence of a synchronization signal.

For example, a sequence 1 of the synchronization signal corresponds to the first index, and a sequence 2 of the synchronization signal and a sequence 3 of the synchronization signal respectively correspond to other indexes. The synchronization signal sequence herein is a PSS sequence or an SSS sequence.

For another example, a PSS and the SSS sequence combination 1 corresponds to the first index, a PSS and the SSS sequence combination 2 and a PSS and the SSS sequence combination 3 respectively correspond to other indexes.

Method 2: The first index of the first common signal in the first set is determined based on the first channel corresponding to the first common signal.

Optionally, the first index of the first common signal in the first set is determined based on one or more of the following pieces of information corresponding to the first channel information indicating the first index, the scrambling code of the first channel, or the DMRS sequence of the first channel.

The information indicating the first index corresponds to a second field of the first channel. For example, the second field includes three bits. In this case, eight indexes is indicated. For example, "000" indicates the first index, and other seven types of bit information indicate other indexes.

The first channel has a plurality of scrambling codes. For example, a scrambling code 1 corresponds to the first index, and a scrambling code 2, a scrambling code 3, and the like respectively correspond to other indexes. In response to the terminal obtaining the scrambling code 1 of the first channel, the first index is determined.

The first channel has a plurality of DMRS sequences. For example, a DMRS sequence 1 corresponds to the first index, and a DMRS sequence 2, a DMRS sequence 3, and the like respectively correspond to other indexes. In response to the terminal obtaining the DMRS sequence 1 of the first channel, the first index is determined.

The foregoing methods for determining a first set from a plurality of sets and the foregoing methods for determining a first index of a first common signal in a first set is implemented in combination.

For example, a first set corresponding to a sequence of a synchronization signal is determined from a plurality of sets based on the sequence of the synchronization signal, and a first index of a first common signal in the first set is determined. For example, a relationship among a synchronization signal sequence, a set, and an index is shown in Table 1.

TABLE 1

| Synchronization signal sequence | Set | Index |
|---|---|---|
| Sequence 1 | 1 | 0 |
| Sequence 2 | 1 | 1 |
| Sequence 3 | 1 | 2 |
| Sequence 4 | 1 | 3 |
| Sequence 5 | 2 | 0 |
| Sequence 6 | 2 | 1 |
| Sequence 7 | 2 | 2 |
| Sequence 8 | 2 | 3 |
| . . . | . . . | . . . |

For example, in response to the sequence of the synchronization signal being a sequence 3, the determined first set is a set 1, and the determined first index is an index 2. In response to the sequence of the synchronization signal being a sequence 6, the determined first set is a set 2, and the determined first index is an index 1.

For another example, a first set is determined from a plurality of sets based on a control channel corresponding to the first common signal, and a first index of the first common signal in the first set is determined. For example, a scrambling code of a control channel is used as an example. A relationship among the scrambling code of the control channel, a set, and an index is shown in Table 2.

TABLE 2

| Control channel scrambling code | Set | Index |
|---|---|---|
| Scrambling code 1 | 1 | 0 |
| Scrambling code 2 | 1 | 1 |
| Scrambling code 3 | 1 | 2 |
| Scrambling code 4 | 1 | 3 |
| Scrambling code 5 | 2 | 0 |
| Scrambling code 6 | 2 | 1 |
| Scrambling code 7 | 2 | 2 |
| Scrambling code 8 | 2 | 3 |
| . . . | . . . | . . . |

For example, in response to the scrambling code of the control channel being a scrambling code 3, the determined first set is the set 1, and the determined first index is the index 2. In response to the scrambling code of the control channel being a scrambling code 6, the determined first set is the set 2, and the determined first index is the index 1.

For another example, a first set corresponding to a sequence of a synchronization signal is determined from a plurality of sets based on the sequence of the synchronization signal, and a first index of a first common signal in the first set is determined based on a broadcast channel corresponding to the first common signal.

For another example, the first set is determined from the plurality of sets based on the broadcast channel corresponding to the first common signal, and the first index of the first common signal in the first set is determined based on the control channel corresponding to the first common signal.

Figure 9:
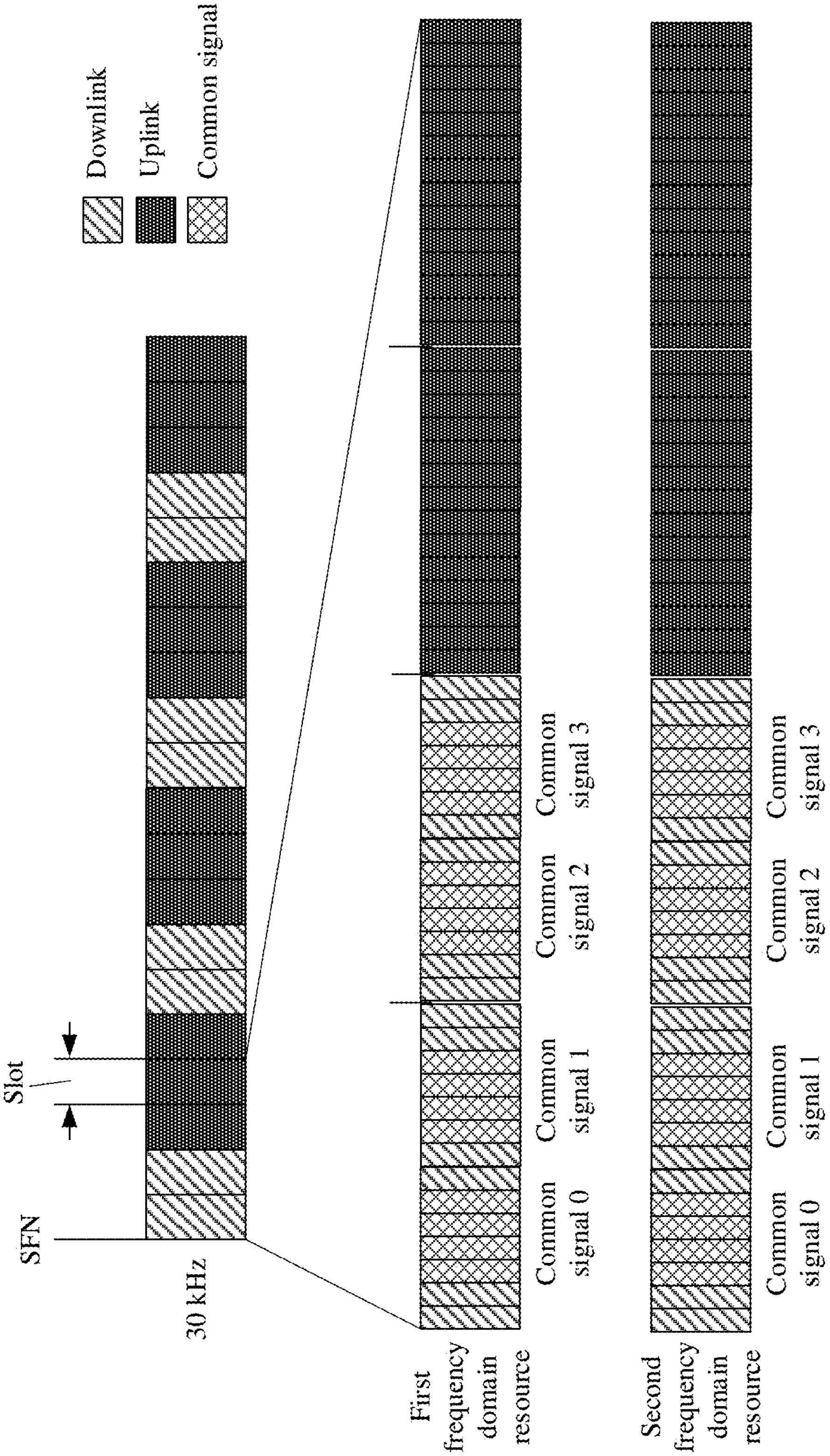
FIG. 9 is a schematic diagram of a common signal transmission manner.

For a problem of how to adapt to common signal transmission in various TDD configurations, at least one embodiment provides another wireless communication method. In the method, a plurality of to-be-sent common signals are sent in a frequency division multiplexing manner. A plurality of common signals corresponding to a same frequency domain resource form a set, and indexes of common signals in different sets is the same. FIG. 9 is a schematic diagram of a common signal transmission manner. In this example, eight common signals are sent in a frequency division multiplexing manner. Four common signals are sent on a first frequency domain resource, and the other four common signals are sent on a second frequency domain resource. The four common signals sent on the first frequency domain resource form a set, and indexes of the common signals in the set are 0, 1, 2, and 3, respectively. The four common signals sent on the second frequency domain resource form a set, and indexes of the common signals in the set are 0, 1, 2, and 3, respectively.

Figure 10:
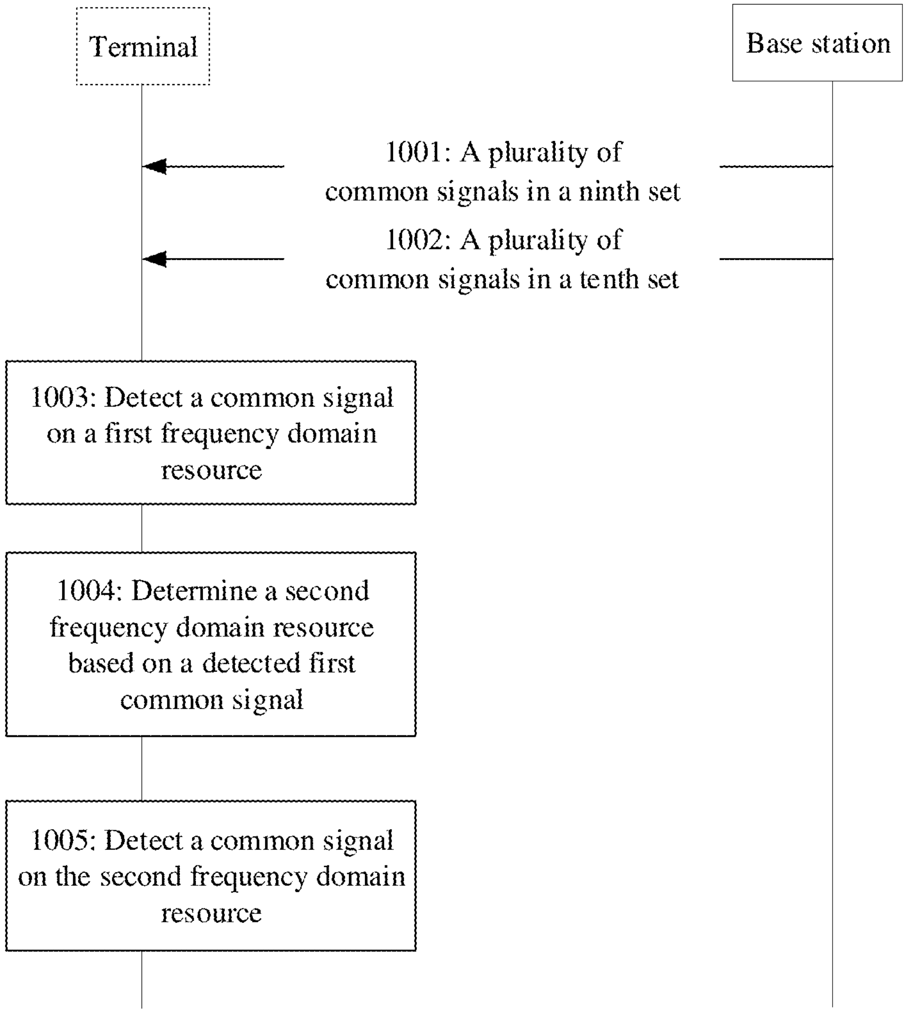
FIG. 10 is a schematic diagram of a wireless communication method according to at least one embodiment.

FIG. 10 is a schematic diagram of another wireless communication method according to at least one embodiment. The method includes the following operations.

1001: A base station sends, on a first frequency domain resource, a plurality of common signals in a ninth set to a terminal.

The first frequency domain resource corresponds to the ninth set, or the plurality of common signals in the ninth set are located on the first frequency domain resource.

FIG. 9 is used as an example. The base station sequentially sends, on the first frequency domain resource in a time division multiplexing manner and a predetermined common signal transmission manner, beams of a common signal 0 to a common signal 3 on the first frequency domain resource to the terminal.

1002: The base station sends, on a second frequency domain resource, a plurality of common signals in a tenth set to the terminal.

The second frequency domain resource corresponds to the tenth set, or the plurality of common signals in the tenth set are located on the second frequency domain resource. The second frequency domain resource is different from the first frequency domain resource.

FIG. 9 is used as an example. The base station sequentially sends, on the second frequency domain resource in the time division multiplexing manner and the predetermined common signal transmission manner, beams of a common signal 0 to a common signal 3 on the second frequency domain resource to the terminal.

The plurality of common signals in the ninth set is associated with or not associated with the plurality of common signals in the tenth set.

1003: The terminal detects a common signal on the first frequency domain resource.

1004: The terminal determines the second frequency domain resource based on a detected first common signal.

The detected first common signal belongs to the ninth set. In other words, the terminal detects a common signal in the ninth set, and the common signal is referred to as the first common signal.

For example, the terminal determines the second frequency domain resource based on a sequence of a synchronization signal in the first common signal. For example, a sequence 1 of the synchronization signal corresponds to a frequency domain resource 1, a sequence 2 of the synchronization signal corresponds to a frequency domain resource 2, and a sequence 3 of the synchronization signal corresponds to a frequency domain resource 3. The synchronization signal sequence herein is a PSS sequence or an SSS sequence. For another example, a PSS and SSS sequence combination 1 corresponds to the frequency domain resource 1, a PSS and SSS sequence combination 2 corresponds to the frequency domain resource 2, and a PSS and SSS sequence combination 3 corresponds to the frequency domain resource 3.

For another example, the terminal determines the second frequency domain resource based on a first channel corresponding to the first common signal. For a meaning of the first channel, refer to the foregoing description. Details are not described again. Optionally, the terminal determines the second frequency domain resource based on one or more of the following pieces of information corresponding to the first channel: information indicating the second frequency domain resource, a scrambling code of the first channel, or a DMRS sequence of the first channel. The information indicating the second frequency domain resource corresponds to a third field of the first channel. For example, the third field includes two bits. In this case, four frequency domain resources is indicated. The first channel has a plurality of scrambling codes. For example, a scrambling code 1 corresponds to a frequency domain resource 1, a scrambling code 2 corresponds to a frequency domain resource 2, and a scrambling code 3 corresponds to a frequency domain resource 3. The first channel has a plurality of DMRS sequences. For example, a DMRS sequence 1 corresponds to the frequency domain resource 1, a DMRS sequence 2 corresponds to the frequency domain resource 2, and a DMRS sequence 3 corresponds to the frequency domain resource 3.

1005: The terminal detects a common signal on the second frequency domain resource.

In a TDD uplink/downlink configuration scenario in which a quantity of uplink time domain resources is greater than a quantity of downlink time domain resources, time domain resources of downlink common signals are limited. In the foregoing solution, different common signals is sent in a frequency division multiplexing manner. In this case, time domain resources occupied by downlink common signals is reduced, thereby resolving a problem of limited time domain resources for downlink common signals. In addition, according to the foregoing solution, the second frequency domain resource is determined based on a detected common signal corresponding to the first frequency domain resource, so that the terminal further detects a common signal on the second frequency domain resource. This avoids a resource waste caused in response to the terminal blindly detecting common signals on frequency domain resources except the first frequency domain resource.

In an implementation, the second frequency domain resource and the first frequency domain resource have different center frequencies, different lowest frequencies, or different highest frequencies.

In an implementation, the second frequency domain resource and the first frequency domain resource do not overlap or partially overlap in frequency domain.

In an implementation, the first frequency domain resource is a first carrier, the second frequency domain resource is a second carrier, and the first carrier is different from the second carrier.

In an implementation, the first frequency domain resource is a first bandwidth part, the second frequency domain resource is a second bandwidth part, and the first bandwidth part is different from the second bandwidth part. A bandwidth part is a frequency domain resource in a carrier. The first bandwidth part and the second bandwidth part belongs to a same carrier or different carriers.

In an implementation, the first frequency domain resource is a first subband, the second frequency domain resource is a second subband, and the first subband is different from the second subband. A subband is a frequency domain resource in a bandwidth part. The first subband and the second subband belongs to a same bandwidth part or different bandwidth parts.

In an implementation, a TDD downlink configuration on the first frequency domain resource is different from a TDD downlink configuration on the second frequency domain resource.

In an implementation, a TDD uplink configuration on the first frequency domain resource is different from a TDD uplink configuration on the second frequency domain resource.

In an implementation, a quantity of uplink time domain resources in the TDD uplink configuration on the first frequency domain resource is greater than a quantity of downlink time domain resources in the TDD uplink configuration on the first frequency domain resource.

In an implementation, a quantity of uplink time domain resources in the TDD downlink configuration on the first frequency domain resource is greater than a quantity of downlink time domain resources in the TDD downlink configuration on the first frequency domain resource.

In an implementation, a quantity of uplink time domain resources in the TDD uplink configuration on the second frequency domain resource is greater than a quantity of downlink time domain resources in the TDD uplink configuration on the second frequency domain resource.

In an implementation, a quantity of uplink time domain resources in the TDD downlink configuration on the second frequency domain resource is greater than a quantity of downlink time domain resources in the TDD downlink configuration on the second frequency domain resource.

In an implementation, resource multiplexing manners of at least two common signals in the ninth set is FDM, or resource multiplexing manners of all common signals in the ninth set are TDM.

In an implementation, resource multiplexing manners of at least two common signals in the tenth set is FDM, or resource multiplexing manners of all common signals in the tenth set are TDM.

In an implementation, a quantity of common signals in the ninth set is different from a quantity of common signals in the tenth set.

In an implementation, a subcarrier spacing of common signals in the ninth set is different from a subcarrier spacing of common signals in the tenth set.

In an implementation, the common signals in the ninth set and the tenth set are both common signals that is used for initial access. The common signal that is used for initial access means that the common signal provides the terminal with related information such as at least one of a synchronization signal or a MIB, for accessing the base station.

In an implementation, the common signals in the ninth set and the tenth set have corresponding first channels.

In an implementation, after the foregoing operation 1004, the first channel corresponding to the first common signal is determined based on the first common signal detected in the ninth set.

In an implementation, after the foregoing operation 1005, the first channel corresponding to the first common signal detected in the tenth set is further determined.

For the first channel and the like, refer to the foregoing embodiment, and details are not described herein again.

To implement functions in the foregoing embodiment, the base station and the terminal include corresponding hardware structures and/or software modules for performing the functions. A person skilled in the art should be easily aware that at least one embodiment is implemented by hardware or a combination of hardware and computer software in combination with the units and the method steps in the examples described in at least one embodiment. Whether a function is performed by hardware or hardware driven by computer software depends on particular application scenarios and design constraints of technical solutions.

Figure 11:
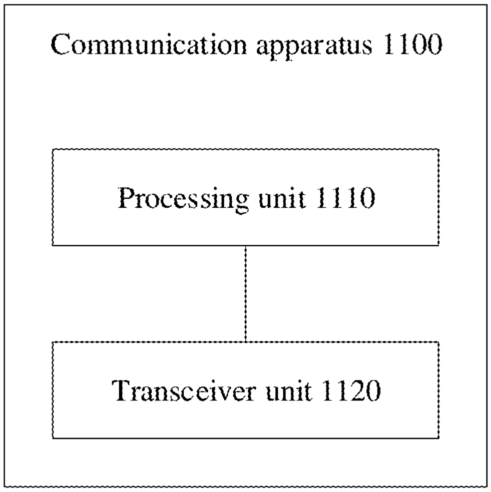
FIG. 11 is a schematic diagram of a structure of a communication apparatus according to at least one embodiment.
Figure 12:
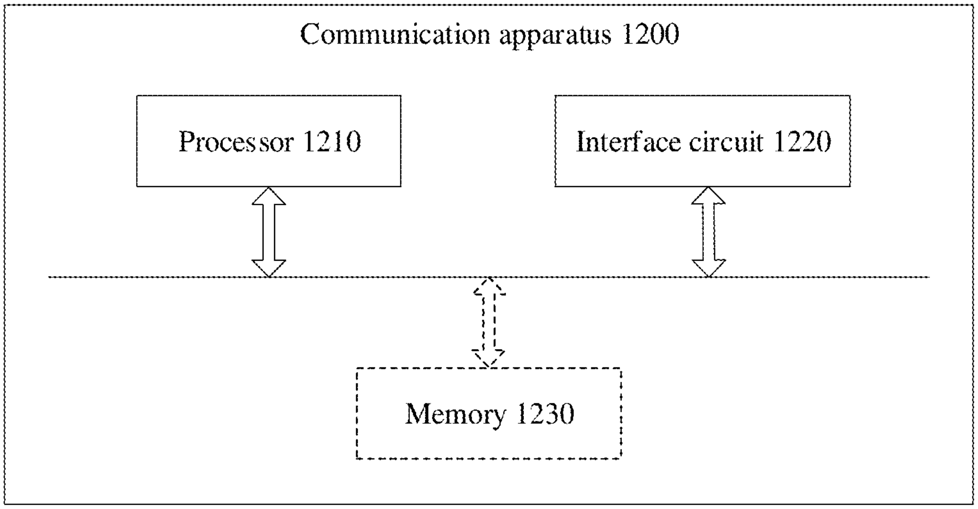
FIG. 12 is a schematic diagram of a structure of a communication apparatus according to at least one embodiment.

FIG. 11 and FIG. 12 are schematic diagrams of structures of communication apparatuses according to at least one embodiment. The communication apparatuses is configured to implement functions of the terminal or the base station in the foregoing method embodiment. Therefore, beneficial effects of the foregoing method embodiment is also achieved. In at least one embodiment, the communication apparatus is one of the terminals 120*a* to 120*j* shown in FIG. 1, the base station 110*a* or 110*b* shown in FIG. 1, or a module (for example, a chip) applied to the terminal or the base station.

As shown in FIG. 11, a communication apparatus 1100 includes a processing unit 1110 and a transceiver unit 1120. The communication apparatus 1100 is configured to implement a function of the terminal or the base station in the method embodiment shown in FIG. 8 or FIG. 10.

In response to the communication apparatus 1100 being configured to implement the function of the terminal in the method embodiment shown in FIG. 8, the transceiver unit 1120 is configured to receive a common signal from the base station; and the processing unit 1110 is configured to: detect a common signal; determine, from a plurality of sets based on a detected first common signal, a first set corresponding to the first common signal, where at least one of the plurality of sets includes a plurality of common signals, the first set includes the first common signal, the first common signal includes a synchronization signal, and resource multiplexing manners of the plurality of common signals include time division multiplexing and/or frequency division multiplexing; and determine a first index of the first common signal in the first set, where the first index corresponds to a resource of the first common signal, and the resource includes a time domain resource and/or a frequency domain resource.

In at least one embodiment, the processing unit 1110 is configured to determine, from the plurality of sets based on a sequence of the synchronization signal, a first set corresponding to the sequence of the synchronization signal.

In at least one embodiment, the processing unit 1110 determines the first set from the plurality of sets based on a first channel corresponding to the first common signal.

In at least one embodiment, the processing unit 1110 is configured to determine the first set from the plurality of sets based on one or more of the following pieces of information corresponding to the first channel information indicating the first set, a scrambling code of the first channel, or a DMRS sequence of the first channel.

In at least one embodiment, the first channel is a broadcast channel; or the first channel is a channel carrying system information; or the first channel is a control channel, and the control channel is used to schedule the channel carrying system information.

In at least one embodiment, the processing unit 1110 is configured to determine, from the plurality of sets based on a minimum carrier bandwidth capability supported by the terminal, a first set corresponding to the minimum carrier bandwidth capability supported by the terminal.

In at least one embodiment, the processing unit 1110 is configured to determine, from the plurality of sets based on a frequency band in which the terminal operates, a first set corresponding to the frequency band in which the terminal operates.

In at least one embodiment, the processing unit 1110 is configured to: determine, from the plurality of sets based on a subcarrier spacing of the first common signal, a first set corresponding to the subcarrier spacing of the first common signal; or determine, from the plurality of sets based on a subcarrier spacing combination, a first set corresponding to the subcarrier spacing combination.

In at least one embodiment, the processing unit 1110 is configured to determine, from the plurality of sets based on a time division duplexing TDD configuration, a first set corresponding to the time division duplexing TDD configuration.

In at least one embodiment, the processing unit 1110 is configured to determine a first index of the first common signal in the first set based on a sequence of the synchronization signal.

In at least one embodiment, the processing unit 1110 is configured to determine a first index of the first common signal in the first set based on the first channel corresponding to the first common signal. The first channel is a broadcast channel; or the first channel is a channel carrying system information; or the first channel is a control channel, and the control channel is used to schedule the channel carrying system information.

In at least one embodiment, the processing unit 1110 is configured to determine the first index of the first common signal in the first set based on one or more of the following pieces of information corresponding to the first channel: information indicating the first index, the scrambling code of the first channel, or the DMRS sequence of the first channel.

In at least one embodiment, the processing unit 1110 is configured to: determine a resource of a second common signal based on the first index; and receive the second common signal based on the resource of the second common signal, where the second common signal includes a control channel or a channel carrying system information, and the control channel is used to schedule the channel carrying system information.

In at least one embodiment, the processing unit 1110 is configured to determine a resource of a common signal other than the first common signal in the first set based on the first set and the first index.

In response to the communication apparatus 1100 being configured to implement the function of the base station in the method embodiment shown in FIG. 8, the processing unit 1110 is configured to determine a first set, where the first set is one of a plurality of sets, at least one of the plurality of sets includes a plurality of common signals, and resource multiplexing manners of the plurality of common signals include time division multiplexing and/or frequency division multiplexing; and the transceiver unit 1120 is configured to send a plurality of common signals in the first set to the terminal, where the first set includes a first common signal, the first common signal is one of the plurality of common signals, the first common signal includes a synchronization signal, and the first common signal is a common signal in the first set that is detected by the terminal.

In at least one embodiment, a sequence of the synchronization signal corresponds to the first set.

In at least one embodiment, a first channel corresponding to the first common signal corresponds to the first set.

In at least one embodiment, one or more of the following pieces of information corresponding to the first channel correspond to the first set: information indicating the first set, a scrambling code of the first channel, or a DMRS sequence of the first channel.

In at least one embodiment, the first channel is a broadcast channel; or the first channel is a channel carrying system information; or the first channel is a control channel, and the control channel is used to schedule the channel carrying system information.

In at least one embodiment, a minimum carrier bandwidth capability supported by the terminal corresponds to the first set.

In at least one embodiment, a frequency band in which the terminal operates corresponds to the first set.

In at least one embodiment, a subcarrier spacing of the first common signal corresponds to the first set; or a subcarrier spacing combination corresponds to the first set, where the subcarrier spacing combination includes a first subcarrier spacing of the first common signal and a second subcarrier spacing of a channel corresponding to the first common signal.

In at least one embodiment, a time division duplexing TDD configuration corresponds to the first set.

In at least one embodiment, the sequence of the synchronization signal corresponds to indexes of the plurality of common signals in the first set.

In at least one embodiment, a first channel corresponding to the first common signal corresponds to the first index of the first common signal in the first set, where the first channel is a broadcast channel; or the first channel is a channel carrying system information; or the first channel is a control channel, and the control channel is used to schedule the channel carrying system information.

In at least one embodiment, one or more of the following pieces of information corresponding to the first channel correspond to the indexes of the plurality of common signals in the first set: information indicating the first set, the scrambling code of the first channel, or the DMRS sequence of the first channel.

In at least one embodiment, the plurality of sets include one or more of the following sets:

a second set, where a resource multiplexing manner of a common signal in the second set is time division multiplexing;

a third set, where resource multiplexing manners of two common signals in the third set are frequency division multiplexing, and a minimum frequency domain distance between the two common signals in the third set that use frequency division multiplexing is a first distance; and a fourth set, where resource multiplexing manners of two common signals in the fourth set are frequency division multiplexing, a minimum frequency domain distance between the two common signals in the fourth set that use frequency division multiplexing is a second distance, and the second distance is different from the first distance.

In at least one embodiment, the plurality of sets include one or more of the following sets:

a fifth set, where a common signal in the fifth set is located in one periodic time window; and a sixth set, where a first part of common signals and a second part of common signals in the sixth set are located in different periodic time windows.

In response to the communication apparatus 1100 being configured to implement the function of the terminal in the method embodiment shown in FIG. 10, the transceiver unit 1120 is configured to: send a plurality of common signals in a ninth set to the terminal on the first frequency domain resource; and send a plurality of common signals in a tenth set to the terminal on the second frequency domain resource.

In response to the communication apparatus 1100 being configured to implement the function of the base station in the method embodiment shown in FIG. 10, the processing unit 1110 is configured to: detect common signals on the first frequency domain resource; determine a position of the second frequency domain resource based on the detected first common signal; and detect common signals on the second frequency domain resource.

For more detailed descriptions of the processing unit 1110 and the transceiver unit 1120, directly refer to related descriptions in the method embodiments shown in FIG. 8 to FIG. 10. Details are not described herein again.

As shown in FIG. 12, a communication apparatus 1200 includes a processor 1210 and an interface circuit 1220. The processor 1210 and the interface circuit 1220 are coupled to each other. The interface circuit 1220 is a transceiver or an input/output interface. Optionally, the communication apparatus 1200 further includes a memory 1230, configured to store instructions executed by the processor 1210, or store input data used by the processor 1210 to run instructions, or store data generated after the processor 1210 runs instructions.

In response to the communication apparatus 1200 being configured to implement the method shown in FIG. 8 or FIG. 10, the processor 1210 is configured to perform a function of the processing unit 1110, and the interface circuit 1220 is configured to perform a function of the transceiver unit 1120.

In response to the communication apparatus being a chip applied to a terminal, the chip in the terminal implements functions of the terminal in the foregoing method embodiments. The terminal chip receives information from another module (for example, a radio frequency module or an antenna) in the terminal, where the information is sent by a base station to the terminal; or the terminal chip sends information to another module (for example, a radio frequency module or an antenna) in the terminal, where the information is sent by the terminal to the base station.

In response to the communication apparatus being a chip applied to the base station, the chip in the base station implements functions of the base station in the foregoing method embodiments. The base station chip receives information from another module (for example, a radio frequency module or an antenna) in the base station, where the information is sent by the terminal to the base station; or the base station chip sends information to another module (for example, a radio frequency module or an antenna) in the base station, where the information is sent by the base station to the terminal.

The processor in at least one embodiment is a central processing unit (CPU), or is another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor is a microprocessor or any conventional processor.

The method steps in at least one embodiment is implemented by hardware, or is implemented by the processor executing software instructions. The software instructions includes corresponding software modules. The software modules is stored in a random access memory, a flash memory, a read-only memory, a programmable read-only memory, an erasable programmable read-only memory, an electrically erasable programmable read-only memory, a register, a hard disk, a removable hard disk, a CD-ROM, or a storage medium in any other form well-known in the art. For example, a storage medium is coupled to the processor, so that the processor reads information from the storage medium and writes information into the storage medium. Certainly, the storage medium is a component of the processor. The processor and the storage medium is disposed in an ASIC. In addition, the ASIC is located in a base station or a terminal. Certainly, the processor and the storage medium exists in the base station or the terminal as discrete components.

All or some of the foregoing embodiments is implemented by using software, hardware, firmware, or any combination thereof. In response to software being used to implement the embodiments, all or some of the embodiments is implemented in a form of a computer program product. The computer program product includes one or more computer programs or instructions. In response to the computer programs or instructions being loaded and executed on a computer, all or some of the processes or the functions in at least one embodiment are performed. The computer is a general-purpose computer, a dedicated computer, a computer network, a base station, user equipment, or another programmable apparatus. The computer programs or instructions is stored in a computer-readable storage medium, or is transmitted from a computer-readable storage medium to another computer-readable storage medium. For example, the computer programs or instructions is transmitted from a website, computer, server, or data center to another website, computer, server, or data center in a wired or wireless manner. The computer-readable storage medium is any usable medium accessible to a computer, or a data storage device that integrates one or more usable media, such as a server or a data center. The usable medium is a magnetic medium, for example, a floppy disk, a hard disk, or a magnetic tape; or is an optical medium, for example, a digital video disc; or is a semiconductor medium, for example, a solid state disk. The computer-readable storage medium is a volatile or non-volatile storage medium, or includes two types of storage media: a volatile storage medium and a non-volatile storage medium.

In at least one embodiment, unless otherwise stated or there is a logic conflict, terms and/or descriptions in different embodiments are consistent and is mutually referenced, and technical features in different embodiments is combined based on an internal logical relationship thereof, to form a new embodiment.

In at least one embodiment, "at least one" means one or more, and "a plurality of" means two or more. "And/or" describes an association relationship between associated objects and represents that three relationships exist. For example, A and/or B represent the following cases: Only A exists, both A and B exist, and only B exists, where A and B is singular or plural. In the text descriptions of at least one embodiment, the character "/" usually indicates an "or" relationship between the associated objects. In a formula in at least one embodiment, the character "/" indicates a "division" relationship between the associated objects.

Various numbers in at least one embodiment are merely used for differentiation for ease of description, and are not used to limit the scope of at least one embodiment. Sequence numbers of the foregoing processes do not mean execution sequences. The execution sequences of the processes should be determined based on functions and internal logic of the processes.

What is claimed is:

1. An apparatus comprising:

at least one processor; and a non-transitory computer readable medium configured to store a program executable by the at least one processor, wherein the at least one processor is configured to execute the program comprising instructions to perform operations for:

detecting a first common signal;

determining, from a plurality of sets in response to the detected first common signal, a first set corresponding to the first common signal, wherein at least one of the plurality of sets includes a plurality of common signals, each of the plurality of common signals corresponds to common signal transmission manners, the common signal transmission manners are usable to indicate resource multiplexing manners corresponding to the common signal transmission manners, the first set includes the first common signal, the first common signal includes a synchronization signal, and the resource multiplexing manners of the plurality of common signals include time division multiplexing or frequency division multiplexing; and determining a first index of the first common signal in the first set, wherein the first index corresponds to a resource of the first common signal, and the resource includes a time domain resource or a frequency domain resource.

2. The apparatus according to claim 1, wherein the at least one processor is further configured to determine, from the plurality of sets, the first set corresponding to the first common signal by:

determining the first set from the plurality of sets based on a first channel corresponding to the first common signal.

3. The apparatus according to claim 2, wherein the at least one processor is further configured to determine the first set from the plurality of sets based on the first channel corresponding to the first common signal by:

determining the first set from the plurality of sets based on one or more pieces of information corresponding to the first channel, wherein the one or more pieces of information includes:

information indicating the first set, a scrambling code of the first channel, or a demodulation reference signal (DMRS) sequence of the first channel.

4. The apparatus according to claim 2, wherein the first channel is a broadcast channel; or the first channel is a channel carrying system information; or the first channel is a control channel, and the control channel is useable to schedule the channel carrying the system information.

5. The apparatus according to claim 1, wherein the at least one processor is further configured to determine the first index by:

determining the first index based on a first channel corresponding to the first common signal, wherein the first channel is a broadcast channel; or the first channel is a channel carrying system information; or the first channel is a control channel, and the control channel is useable to schedule the channel carrying system information.

6. The apparatus according to claim 1, wherein the plurality of sets includes one or more of:

a second set, wherein a resource multiplexing manner of two common signals in the second set is time division multiplexing;

a third set, wherein resource multiplexing manners of two common signals in the third set are frequency division multiplexing, and a minimum frequency domain distance between the two common signals in the third set that use frequency division multiplexing is a first distance; and a fourth set, wherein resource multiplexing manners of two common signals in the fourth set are frequency division multiplexing, a minimum frequency domain distance between the two common signals in the fourth set that use frequency division multiplexing is a second distance, and the second distance is different from the first distance.

7. The apparatus according to claim 1, wherein the at least one processor is further configured to perform operations for:

determining a resource of a second common signal based on the first index; and receiving the second common signal based on the resource of the second common signal, wherein the second common signal includes a control channel or a channel carrying system information, and the control channel is useable to schedule the channel carrying system information.

8. A wireless communication method, comprising:

determining a first set, wherein the first set is one of a plurality of sets, at least one of the plurality of sets includes a plurality of common signals, each of the plurality of common signals corresponds to common signal transmission manners, the common signal transmission manners are usable to indicate resource multiplexing manners corresponding to the common signal transmission manners, the resource multiplexing manners of the plurality of common signals include time division multiplexing or frequency division multiplexing; and sending the plurality of common signals in the first set to a terminal, wherein the first set includes a first common signal, the first common signal is one of the plurality of common signals, and the first common signal includes a synchronization signal.

9. The method according to claim 8, wherein the sending the plurality of common signals including the first common signal includes sending the first common signal corresponding to the first set using a first channel.

10. The method according to claim 9, wherein the sending the first common signal corresponding to the first set using the first channel includes sending one or more pieces of information using the first channel corresponding to the first set, wherein the one or more pieces of information include:

information indicating the first set, a scrambling code of the first channel, or a demodulation reference signal (DMRS) sequence of the first channel.

11. The method according to claim 9, wherein the sending the first common signal corresponding to the first set using the first channel includes sending the first common signal corresponding to the first set using:

a broadcast channel; or a channel carrying system information; or a control channel, and the control channel is used to schedule the channel carrying the system information.

12. The method according to claim 9, wherein sending the plurality of common signals including the first common signal includes sending a first index; and wherein the first channel is a broadcast channel; or the first channel is a channel carrying system information; or the first channel is a control channel, and the control channel is used to schedule the channel carrying the system information.

13. The method according to claim 8, further comprising determining the plurality of sets include one or more of:

a second set, wherein a resource multiplexing manner of two common signals in the second set is time division multiplexing;

a third set, wherein resource multiplexing manners of two common signals in the third set are frequency division multiplexing, and a minimum frequency domain distance between the two common signals in the third set that use frequency division multiplexing is a first distance; and a fourth set, wherein resource multiplexing manners of two common signals in the fourth set are frequency division multiplexing, a minimum frequency domain distance between the two common signals in the fourth set that use frequency division multiplexing is a second distance, and the second distance is different from the first distance.

14. An apparatus comprising:

at least one processor; and a non-transitory computer readable medium storing a program executable by the at least one processor, wherein the at least one processor is configured to execute the program comprising instructions to perform operations for:

determining a first set, wherein the first set is one of a plurality of sets, at least one of the plurality of sets includes a plurality of common signals, each of the plurality of common signals corresponds to common signal transmission manners, the common signal transmission manners are usable to indicate resource multiplexing manners corresponding to the common signal transmission manners, the resource multiplexing manners of the plurality of common signals include time division multiplexing or frequency division multiplexing; and sending the plurality of common signals in the first set to a terminal, wherein the first set includes a first common signal, the first common signal is one of the plurality of common signals, and the first common signal includes a synchronization signal.

15. The apparatus according to claim 14, wherein the at least one processor is configured to send the plurality of common signals including the first common signal by sending the first common signal corresponding to the first set using a first channel.

16. The apparatus according to claim 15, wherein one or more pieces of information include:

information indicating the first set, a scrambling code of the first channel, or a demodulation reference signal (DMRS) sequence of the first channel.

17. The apparatus according to claim 15, wherein the first channel is a broadcast channel; or the first channel is a channel carrying system information; or the first channel is a control channel, and the control channel is used to schedule the channel carrying system information.

18. The apparatus according to claim 15, wherein the first channel corresponding to the first common signal corresponds to a first index of the first common signal in the first set; and the first channel is a broadcast channel; or the first channel is a channel carrying system information; or the first channel is a control channel, and the control channel is used to schedule the channel carrying system information.

19. The apparatus according to claim 14, wherein the plurality of sets include one or more of the following sets:

a second set, wherein a resource multiplexing manner of two common signals in the second set is time division multiplexing;

a third set, wherein resource multiplexing manners of two common signals in the third set are frequency division multiplexing, and a minimum frequency domain distance between the two common signals in the third set that use frequency division multiplexing is a first distance; and a fourth set, wherein resource multiplexing manners of two common signals in the fourth set are frequency division multiplexing, a minimum frequency domain distance between the two common signals in the fourth set that use frequency division multiplexing is a second distance, and the second distance is different from the first distance.

* * * * *